(12) United States Patent
Baek et al.

(10) Patent No.: US 8,386,949 B2
(45) Date of Patent: Feb. 26, 2013

(54) MOBILE TERMINAL AND METHOD OF PROVIDING SCHEDULER THEREIN

(75) Inventors: Sung Min Baek, Seoul (KR); Jeong Mee Koh, Seoul (KR); Jong Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 969 days.

(21) Appl. No.: 12/410,140

(22) Filed: Mar. 24, 2009

(65) Prior Publication Data

US 2010/0099462 A1   Apr. 22, 2010

(30) Foreign Application Priority Data

Oct. 22, 2008   (KR) .................. 10-2008-0103436

(51) Int. Cl.
*G06F 13/00* (2006.01)
*G06F 15/00* (2006.01)

(52) U.S. Cl. ...................................... 715/769; 715/863
(58) Field of Classification Search .............. 715/769, 715/863, 803, 784, 763–765, 847; 455/566
See application file for complete search history.

(56) References Cited

U.S. PATENT DOCUMENTS

2008/0297485 A1* 12/2008 Park .......................... 345/173
2009/0228820 A1*  9/2009 Kim et al. ................... 715/769

* cited by examiner

*Primary Examiner* — Cao "Kevin" Nguyen
(74) *Attorney, Agent, or Firm* — Birch, Stewart, Kolasch & Birch, LLP

(57) ABSTRACT

A mobile terminal and a method of providing a scheduler therein are provided. The mobile terminal comprises: a touch screen; a memory unit for storing a scheduler; and a controller for controlling to display, when displaying a screen of the scheduler on the touch screen, an indicator for changing a relative position thereof to a time axis and for representing a time range of any schedule item by the relative position thereof on the scheduler screen.

6 Claims, 26 Drawing Sheets

MOBILE TERMINAL AND METHOD OF PROVIDING SCHEDULER THEREIN

This nonprovisional application claims priority under 35 U.S.C. §119(a) on Patent Application No. 10-2008-0103436 filed in the Republic of Korea on Oct. 22, 2008, the entire contents of which are hereby incorporated by reference.

BACKGROUND

1. Field

This document relates to a mobile terminal, and more particularly, to a mobile terminal and a method of providing a scheduler therein that provide a scheduler that can input/edit/manage/display a schedule in the mobile terminal.

2. Related Art

As a terminal such as a personal computer (PC), a laptop computer, and a mobile phone has various functions, the terminal is embodied as a multimedia player having complex functions such as photographing of a picture or a moving image, reproduction of a music file or a moving image file, a game player, and reception of broadcasting.

The terminal is classified into a mobile terminal and a stationary terminal according to mobility. The mobile terminal is classified into a handheld terminal and a vehicle mount terminal according to whether a user can carry in the hand.

In order to support and enlarge a function of the terminal, it is considered to improve a structural portion and/or a software portion of the terminal.

Nowadays, as the terminals comprising the mobile terminal provide complex and various functions, the terminals provide a scheduler function. However, as a scheduler function provided in various terminals comprising a conventional mobile terminal provides only a very simple user interface, the user has felt inconvenience when inputting, inquiring, or managing a schedule. Particularly, such inconvenience is remarkable when using the mobile terminal.

SUMMARY

An aspect of this document is to provide a mobile terminal and a method of providing a scheduler therein in which a user can simply and conveniently input, inquire, or manage a schedule.

In an aspect, a mobile terminal comprises: a touch screen; a memory unit for storing a scheduler; and a controller for controlling to display, when displaying a screen of the scheduler on the touch screen, an indicator for changing a relative position thereof to a time axis and for representing a time range of any schedule item by the relative position thereof on the scheduler screen.

In another aspect, a mobile terminal comprises: a touch screen; a memory unit for storing a scheduler; and a controller for controlling to display a screen of the scheduler on the touch screen and to zoom-in or zoom-out the scheduler screen in order to change a time range of the scheduler screen when receiving a predetermined input signal.

In another aspect, a mobile terminal comprises: a touch screen; a memory unit for storing a scheduler for providing a plurality of scheduler screens comprising a first scheduler screen and a second scheduler screen; a position detection unit for detecting a position change of the mobile terminal; and a controller for converting, when displaying the first scheduler screen on the touch screen, if a position change value of the mobile terminal detected by the position detection unit is greater than a threshold value, the first scheduler screen to the second scheduler screen, wherein one of the first scheduler screen and the second scheduler screen provides a screen scroll and the remaining one does not provide a screen scroll.

In another aspect, a method of providing a scheduler in a mobile terminal having a touch screen, comprises: displaying a scheduler screen comprising an indicator for representing a time range of any schedule item and a time axis on the touch screen; changing a relative position of the indicator to the time axis; and updating the time range of the schedule item according to the change of the relative position of the indicator.

In another aspect, a method of providing a scheduler in a mobile terminal having a touch screen, comprises: displaying a scheduler screen on the touch screen; receiving a predetermined input signal; and zooming-in or zooming-out the scheduler screen in order to change a time range of the scheduler screen according to reception of the input signal.

In another aspect, a method of providing a scheduler in a mobile terminal having a touch screen, comprises: displaying a first scheduler screen provided by the scheduler on the touch screen; detecting a position change of the mobile terminal; and converting, if a position change value is greater than a threshold value, the first scheduler screen to a second scheduler screen provided by the scheduler, wherein one of the first scheduler screen and the second scheduler screen provides a screen scroll and the remaining one does not provide a screen scroll.

BRIEF DESCRIPTION OF THE DRAWINGS

The implementation of this document will be described in detail with reference to the following drawings in which like numerals refer to like elements.

DETAILED DESCRIPTION

Figure 1:
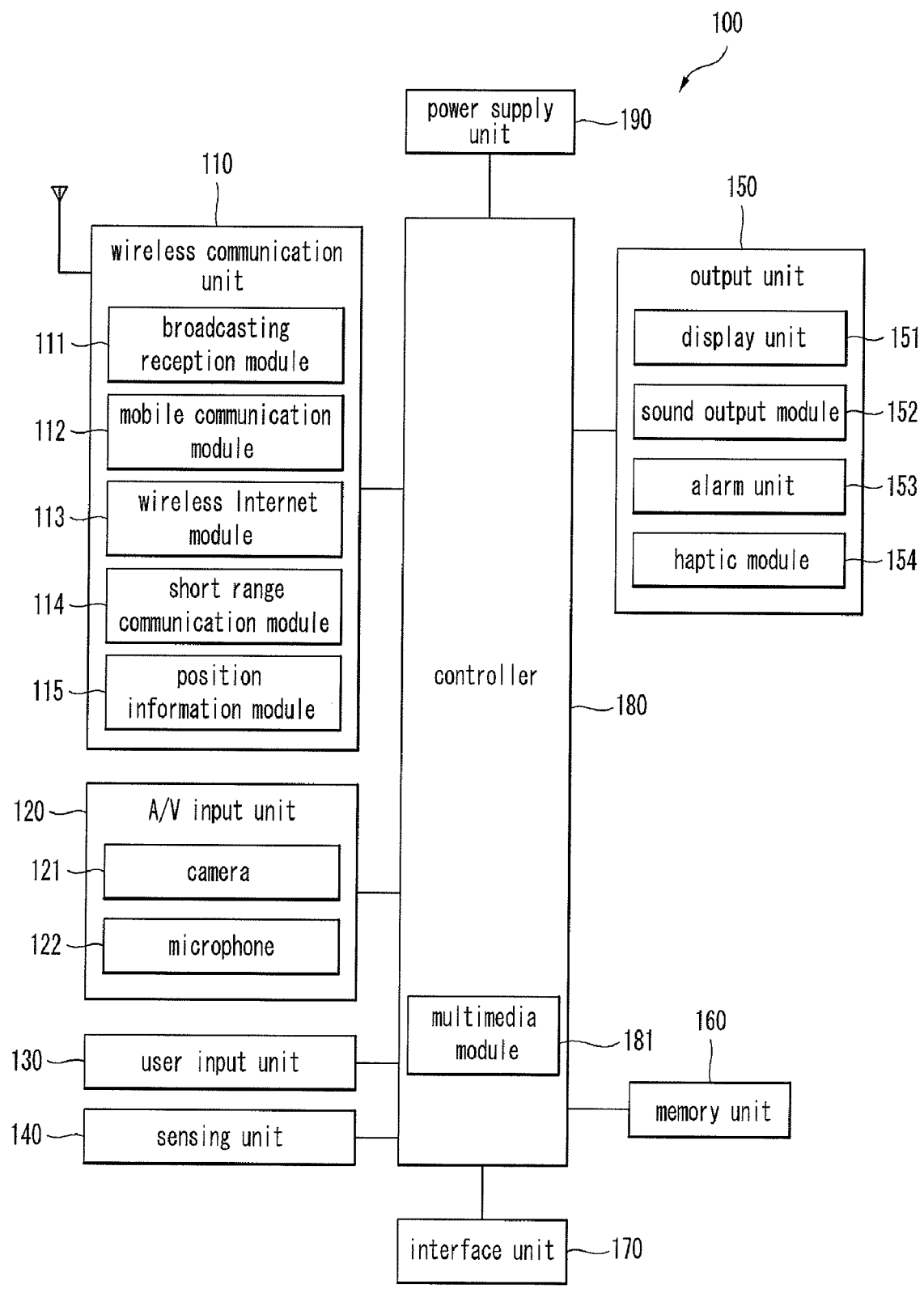
FIG. 1 is a block diagram illustrating a configuration of a mobile terminal according to an implementation of this document.

These and other objects of this document will become more readily apparent from the detailed description given hereinafter with reference to the drawings. Hereinafter, implementations of this document are described in detail with reference to the attached drawings. Like reference numerals designate like elements throughout the specification. Further, detailed descriptions of well-known functions and structures incorporated herein may be omitted to avoid obscuring the subject matter of this document.

Hereinafter, a mobile terminal according to an implementation of this document is described in detail with reference to the drawings. In the following description, suffixes "module" and "unit" of constituent elements are given or used for easily describing a specification, instead of having a distinctive meaning or function.

The mobile terminal described in this document may comprise a mobile phone, a smart phone, a laptop computer, a digital broadcasting terminal, a personal digital assistant (PDA), a portable multimedia player (PMP), and a navigation terminal.

FIG. 1 is a block diagram illustrating a configuration of a mobile terminal according to an implementation of this document.

The mobile terminal 100 comprises a wireless communication unit 110, an audio/video (A/V) input unit 120, a user input unit 130, a sensing unit 140, an output unit 150, a memory unit 160, an interface unit 170, a controller 180, and a power supply unit 190. Because constituent units shown in FIG. 1 are not essential, the mobile terminal 100 may comprise constituent units more than or less than those shown in FIG. 1.

Hereinafter, the constituent units will be described in detail.

The wireless communication unit 110 comprises at least one module for allowing wireless communication between the mobile terminal 100 and a wireless communication system, or between the mobile terminal 100 and a network at which the mobile terminal 100 is positioned. For example, the wireless communication unit 110 comprises a broadcasting reception module 111, a mobile communication module 112, a wireless Internet module 113, a short range communication module 114, and a position information module 115.

The broadcasting reception module 111 receives a broadcasting signal and/or broadcasting related information from an external broadcasting management server through a broadcasting channel.

The broadcasting channel comprises a satellite channel and a terrestrial channel. The broadcasting management server is a server for generating and transmitting a broadcasting signal and/or broadcasting related information, or a server for receiving the generated broadcasting signal and/or broadcasting related information and for transmitting the received broadcasting signal and/or broadcasting related information to the terminal. The broadcasting signal may comprise a television broadcasting signal, a radio broadcasting signal, a data broadcasting signal, and a broadcasting signal in which the data broadcasting signal is coupled to the television broadcasting signal or the radio broadcasting signal.

The broadcasting related information is information related to a broadcasting channel, a broadcasting program, or a broadcasting service provider. The broadcasting related information may be provided through a mobile communication network. In this case, the broadcasting related information may be received by the mobile communication module 112.

The broadcasting related information may exist in various forms. For example, the broadcasting related information may exist in a form of an electronic program guide (EPG) of digital multimedia broadcasting (DMB), or an electronic service guide (ESG) of digital video broadcast-handheld (DVB-H).

The broadcasting reception module 111 receives a broadcasting signal using various broadcasting systems and may receive a digital broadcasting signal using a digital broadcasting system such as digital multimedia broadcasting-terrestrial (DMB-T), digital multimedia broadcasting-satellite (DMB-S), media forward link only (MediaFLO), digital video broadcast-handheld (DVB-H), and integrated services digital broadcast-terrestrial (ISDB-T). Further, the broadcasting reception module 111 may be formed to be appropriate to other broadcasting systems for providing a broadcasting signal as well as the above-described digital broadcasting system.

The broadcasting signal and/or the broadcasting related information received through the broadcasting reception module 111 may be stored in the memory unit 160.

The mobile communication module 112 transmits and receives a wireless signal to and from at least one of a base station, an external terminal, and a server on a mobile communication network. The wireless signal comprises various forms of data according to transmission and reception of a voice call signal, an audiovisual communication call signal, or a character/multimedia message.

The wireless Internet module 113 is a module for connecting to wireless Internet and may be provided at the inside or the outside of the mobile terminal 100. As a wireless Internet technology, wireless local area network (WLAN) (Wi-Fi), wireless broadband (Wibro), world interoperability for microwave access (Wimax), and high speed downlink packet access (HSDPA) may be used.

The short range communication module 114 is a module for short range communication. As a short range communication technology, Bluetooth, radio frequency identification (RFID), infrared data association (IrDA), ultra wideband (UWB), and ZigBee may be used.

The position information module 115 is a module for checking or obtaining a position of the mobile terminal 100. A typical position information module is a global position system (GPS) module. According to a current technology, the GPS module 115 calculates information about a distance in which one point (object) is separated from three or more satellites and information about a measured time point of the distance information and applies trigonometry to the calculated distance information, thereby calculating three-dimensional (3D) position information according to a latitude, a longitude, and an altitude of the one point (object) at one time point. Further, the GPS module 115 uses a method of calculating position and time information using three satellites and adjusting an error of the calculated position and time information using another satellite. The GPS module 115 continues to calculate a present position in real time and calculates speed information using the calculated positions.

Referring to FIG. 1, the A/V input unit 120 is used for inputting an audio signal or a video signal and comprises a camera 121 and a microphone 122. The camera 121 processes an image frame of a still image or a moving image obtained by an image sensor in an audiovisual communication mode or a photographing mode. The processed image frame is displayed in the display unit 151.

The image frame processed in the camera 121 may be stored in the memory unit 160, or transmitted to the outside through the wireless communication unit 110. According to a configuration of the mobile terminal 100, two or more cameras 121 may be provided.

The microphone 122 receives an external sound signal and processes the external sound signal to electrical sound data in a communication mode, a recording mode, or a voice recognition mode. The processed sound data are converted to a format that can be transmitted and are output to a mobile communication base station through the mobile communication module 112 in a communication mode. In the microphone 122, various noise removal algorithm for removing noise to be generated when receiving an external sound signal may be used.

The user input unit 130 is used for inputting data for controlling an operation of the mobile terminal 100 by a user. The user input unit 130 comprises a keypad, a dome switch, a touch pad (static pressure/static electricity), a jog wheel, and a jog switch.

The sensing unit 140 detects a present state of the mobile terminal 100 such as an opening or closing state of the mobile terminal 100, a position of the mobile terminal 100, user contact, an orientation of the mobile terminal 100, and acceleration/deceleration of the mobile terminal 100 and generates a sensing signal for controlling an operation of the mobile terminal 100. For example, when the mobile terminal 100 has a slide phone form, the sensing unit 140 senses an opening or closing state of a slide phone. Further, the sensing unit 140 may perform a sensing function related to power supply of the power supply unit 190 and coupling of the interface unit 170 to external appliances. The sensing unit 140 may comprise a proximity sensor 141.

The output unit 150 generates the output related to visual sense, hearing sense, or tactile sense and comprises a display unit 151, a sound output module 152, an alarm unit 153, and a haptic module 154.

The display unit 151 displays information processed in the mobile terminal 100. For example, when the mobile terminal 100 is in a communication mode, the display unit 151 displays a user interface (UI) or a graphic user interface (GUI) related to communication. When the mobile terminal 100 is in an audiovisual communication mode or a photographing mode, the mobile terminal 100 displays the photographed or/and received image, the UI, or the GUI.

The display unit 151 may comprise at least one of a liquid crystal display (LCD), a thin film transistor-liquid crystal display (TFT-LCD), an organic light-emitting diode, a flexible display, and a 3D display.

In order to allow to view the outside through the display, some display may be formed in a transparent type or a light transmitting type. This is called a transparent display, and a typical transparent display is a transparent LCD. A rear structure of the display unit 151 may also be formed in a light transmitting type structure. Due to such a structure, the user can view an object positioned at the rear side of a terminal body through an occupying area of the display unit 151 of the terminal body.

According to an implementation form of the mobile terminal 100, two or more display units 151 may exist. For example, in the mobile terminal 100, a plurality of display units may be each disposed apart at one surface, be integrally disposed, or be each disposed at different surfaces.

When the display unit 151 and a sensor (hereinafter, referred to as a 'touch sensor') for detecting a touch action are formed in an interlayer structure (hereinafter, referred to as a 'touch screen'), the display unit 151 can be used as an input device as well as an output device. The touch sensor may have a form such as a touch film, a touch sheet, and a touch pad.

The touch sensor converts the change of a pressure applied to a specific portion of the display unit 151, or the change of capacitance occurred in a specific portion of the display unit 151 to an electrical input signal. The touch sensor can detect a touch position, a touch area, and a touch pressure.

When a touch is input to the touch sensor, a signal corresponding thereto is sent to a touch controller. The touch controller processes the signal and transmits data corresponding thereto to the controller 180. Thereby, the controller 180 can know a touch area of the display unit 151.

Referring to FIG. 1, the proximity sensor 141 may be disposed at an internal area of the mobile terminal 100 enclosed by the touch screen, or at a periphery of the touch screen. The proximity sensor 141 is a sensor for detecting an object approaching a predetermined detection surface, or an object existing at a periphery thereof using force of an electromagnetic field, or infrared without a mechanical contact. The proximity sensor 141 has lifetime longer than and is used more widely than a contact sensor.

The proximity sensor 141 comprises, for example, a transmissive type photoelectric sensor, a direct reflective type photoelectric sensor, a mirror reflective type photoelectric sensor, a high frequency oscillation type proximity sensor, a capacitance type proximity sensor, a magnetic type proximity sensor, and an infrared ray proximity sensor.

When the touch screen is a capacitance type touch screen, the proximity sensor 141 detects the approach of the pointer with the change of an electric field according to the approach of a pointer. In this case, the touch screen (touch sensor) may be classified into a proximity sensor.

Hereinafter, for convenience of description, when the pointer approaches without contacting on the touch screen, an action of recognizing that the pointer is positioned on the touch screen is called a 'proximity touch', and an action in which the pointer actually contacts the touch screen is called a 'contact touch'. A position recognized as a proximity touch by the pointer on the touch screen is a position at which the pointer is vertically disposed relative to the touch screen when the pointer performs a proximity touch.

The proximity sensor 141 detects a proximity touch and a proximity touch pattern (for example, a proximity touch distance, a proximity touch direction, a proximity touch speed, a proximity touch time period, a proximity touch position, and a proximity touch moving state). Information corresponding to the detected proximity touch action and proximity touch pattern may be output on the touch screen.

The sound output module 152 may output audio data received from the wireless communication unit 110, or stored in the memory unit 160 in a call signal reception mode, a communication mode or a recording mode, a voice recognition mode, and a broadcasting reception mode. The sound output module 152 outputs a sound signal related to a function (for example, call signal reception sound and message reception sound) performed in the mobile terminal 100. The sound output module 152 may comprise a receiver, a speaker, and a buzzer.

The alarm unit 153 outputs a signal for notifying occurrence of an event in the mobile terminal 100. The event occurred in the mobile terminal 100 comprises, for example, call signal reception, message reception, key signal input, and touch input. The alarm unit 153 may output other forms, for example, a signal for notifying occurrence of an event with vibration in addition to a video signal or an audio signal. The video signal or the audio signal may be output through the display unit 151 or the sound output module 152.

The haptic module 154 generates various haptic effects in which a user can feel. A typical haptic effect generated by the haptic module 154 is vibration. Intensity and a pattern of vibration generated by the haptic module 154 can be controlled. For example, the haptic module 154 may synthesize and output different vibration, or sequentially output different vibration.

The haptic module 154 may generate various haptic effects such as a stimulation effect due to arrangement of pins vertically moving relative to a skin contact surface, a stimulation effect using an injection force or an inhalation force of air through an injection nozzle or an inhalation nozzle, a stimulation effect due to grazing of a skin surface, a stimulation effect through a contact of an electrode, a stimulation effect using an electrostatic force, and a stimulation effect due to reproduction of cold and warmth feeling using an element that can absorb or emit heat, in addition to vibration.

The haptic module 154 transmits a haptic effect through a direct contact and may allow to feel a haptic effect through muscular sense of a user's finger or arm. According to a configuration of the mobile terminal 100, two or more haptic modules 154 may be provided.

The memory unit 160 stores a program for operating the controller 180 and may temporarily store input/output data (for example, a phonebook, a message, a still image, and a moving image). The memory unit 160 stores data about various patterns of vibration and sound to be output when a touch is input on the touch screen.

The memory unit 160 may comprise at least one of a flash memory type, a hard disk type, a multimedia card micro type, and a card type memory (for example, secure digital (SD) memory, or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may use web storage for performing a storage function of the memory unit 160 in Internet.

The interface unit 170 functions as a passage for all external appliances connected to the mobile terminal 100. The interface unit 170 receives data or power from the external appliances and transfers the data or power to constituent units within the mobile terminal 100, or transmits data within the mobile terminal 100 to external appliances. For example, the interface unit 170 may comprise a wired/wireless headset port, an external charger port, a wired/wireless data port, a memory card port, a port for connecting a device having an identity module, an audio I/O port, a video I/O port, and an earphone port.

The identity module is a chip for storing various information for certifying user authority of the mobile terminal 100 and comprises a user identify module (UIM), a subscriber identify module (SIM), and a universal subscriber identify module (USIM). The device (hereinafter, referred to as an 'identity device') having the identity module may be manufactured in a smart card form. Therefore, the identity device can be connected to the mobile terminal 100 through a port.

When the mobile terminal 100 is connected to an external cradle, the interface unit 170 may become a passage for supplying power from the cradle to the mobile terminal 100, or become a passage for transferring various instruction signals input to the cradle by the user to the mobile terminal 100. Various instruction signals or power input from the cradle may be used as a signal for recognizing that the mobile terminal 100 is accurately mounted in the cradle.

The controller 180 controls general operations of the mobile terminal 100. For example, the controller 180 performs the control and a processing related to voice communication, data communication, and audiovisual communication. The controller 180 may comprise a multimedia module 181 for reproducing multimedia. The multimedia module 181 may be provided within the controller 180, or may be provided separately from the controller 180. The controller 180 performs a pattern recognition processing that can recognize cursive input or drawing input performed on the touch screen as a character or an image, respectively.

The power supply unit 190 receives external power and internal power to supply power necessary for operating constituent units by the control of the controller 180.

Various implementations described in this document can be embodied within a record medium that can be read by a computer or devices similar thereto using software, hardware, or a combination thereof.

When embodying using hardware, the implementations described in this document can be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for executing a function. In some cases, the implementations can be embodied by the controller 180.

When embodying using software, implementations such as a procedure and a function can be embodied together with a separate software module for allowing to perform at least one function or operation. A software code can be embodied by a software application prepared with an appropriate programming language. Further, the software code can be stored in the memory unit 160 and executed by the controller 180.

Figure 2A:
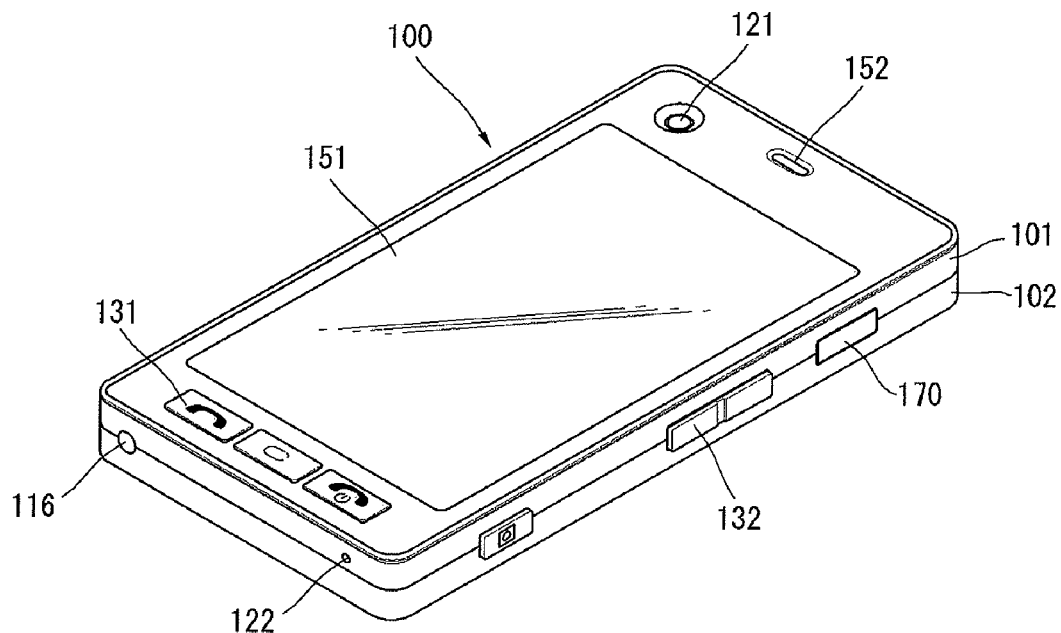
FIG. 2A is a front perspective view of a mobile terminal according to an implementation of this document.

FIG. 2A is a front perspective view of a mobile terminal according to an implementation of this document.

The mobile terminal 100 described in FIG. 2A has a bar type terminal body. However, the mobile terminal 100 is not limited thereto and may have various structures such as a slide type, a folder type, a swing type, and a swivel type in which two or more bodies are coupled to perform relative movement.

The terminal body comprises a case (a casing, a housing, a cover, etc.) for forming external appearance. In the present implementation, the case comprises a front case 101 and a rear case 102. Various electronic components are provided in space formed between the front case 101 and the rear case 102. At least one intermediate case may be additionally disposed between the front case 101 and the rear case 102.

The cases may be formed by injecting synthetic resin, or be made of a metal material such as stainless steel (STS) or titanium (Ti).

In the front case 101 of the terminal body, the display unit 151, the sound output module 152, the camera 121, the user input unit 130; 131 and 132, the microphone 122, and the interface unit 170 are disposed.

The display unit 151 occupies most of the front case 101. The sound output module 152 and the camera 121 are disposed at an area adjacent to one end portion of both end portions of the display unit 151, and the user input unit 131 and the microphone 122 are disposed at an area adjacent to the other end portion thereof. The user input unit 132 and the interface unit 170 are disposed at side surfaces of the front case 101 and the rear case 102.

The user input unit 130 is manipulated to input an instruction for controlling an operation of the mobile terminal 100 and comprises a plurality of manipulation units 131 and 132. The manipulation units 131 and 132 may be called a manipulating portion and may use any tactile manner in which the user manipulates with a tactile feeling.

Contents input by the first and second manipulation units 131 and 132 may be variously set. For example, the first manipulation unit 131 may receive an instruction such as start, end, and scroll, and the second manipulation unit 132 may receive an instruction such as level adjustment of sound output from the sound output module 152, or mode conversion of the display unit 151 to a touch recognition mode.

Figure 2B:
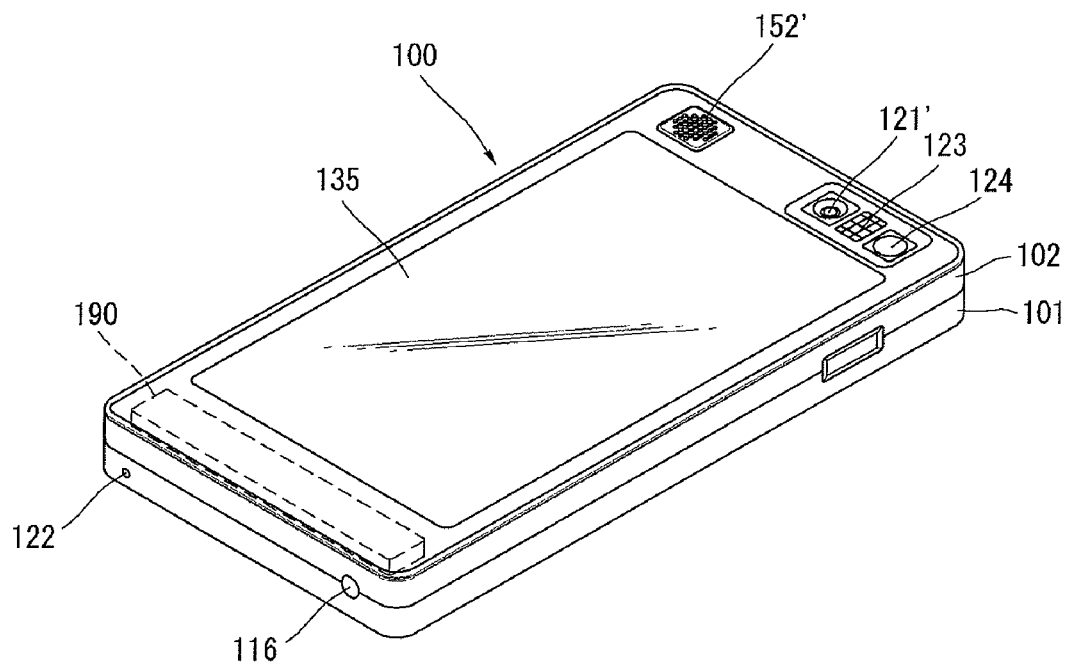
FIG. 2B is a rear perspective view of a mobile terminal according to an implementation of this document.

FIG. 2B is a rear perspective view of the mobile terminal 100 shown in FIG. 2A.

Referring to FIG. 2B, a camera 121' may be additionally mounted in a rear surface, i.e. in the rear case 102 of the terminal body. The camera 121' has a photographing direction substantially opposite to that of the camera 121 (see FIG. 2A) and may have a pixel different from that of the camera 121.

For example, it is preferable that the camera 121 has a lower pixel to photograph a user's face and to transmit without difficulty the photographed user face to another party upon performing audiovisual communication, and the camera 121' has a higher pixel because the camera 121' photographs a general subject and does not transmit the photographed subject. The cameras 121 and 121' may be provided to rotate or pop-up in the terminal body.

A flashlight 123 and a mirror 124 are additionally disposed adjacently to the camera 121'. When photographing a subject with the camera 121', the flashlight 123 emits light toward the subject. When the user photographs himself using the camera 121', the mirror 124 is used for viewing his face.

A sound output module 152' may be additionally disposed at the rear surface of the terminal body. The sound output module 152' can embody a stereo function together with the sound output module 152 (see FIG. 2A) and may be used for embodying a speakerphone mode upon communicating.

At a side surface of the terminal body, a broadcasting signal reception antenna (not shown) in addition to an antenna for communication may be additionally disposed. An antenna (not shown) for forming a part of the broadcasting reception module 111 (see FIG. 1) may be installed to be withdrawn from the terminal body.

The power supply unit 190 for supplying power to the mobile terminal 100 is mounted in the terminal body. The power supply unit 190 may be provided within the terminal body, or be detachably provided at the outside of the terminal body.

A touch pad 135 for detecting a touch may be additionally mounted in the rear case 102. Similarly to the display unit 151, the touch pad 135 may be also formed in a light transmitting type. In this case, if the display unit 151 is formed to output visual information from both surfaces, the visual information can be viewed through the touch pad 135. All information output from the both surfaces may be controlled by the touch pad 135. Alternatively, as a display is additionally mounted in the touch pad 135, a touch screen may be disposed even at the rear case 102.

The touch pad 135 mutually operates with the display unit 151 of the front case 101. The touch pad 135 is disposed in parallel to the rear side of the display unit 151 at the rear side thereof. The touch pad 135 may have a size equal to or smaller than that of the display unit 151.

Hereinafter, a mutual operation method of the display unit 151 and the touch pad 135 is described with reference to FIGS. 3A and 3B.

Figure 3A:
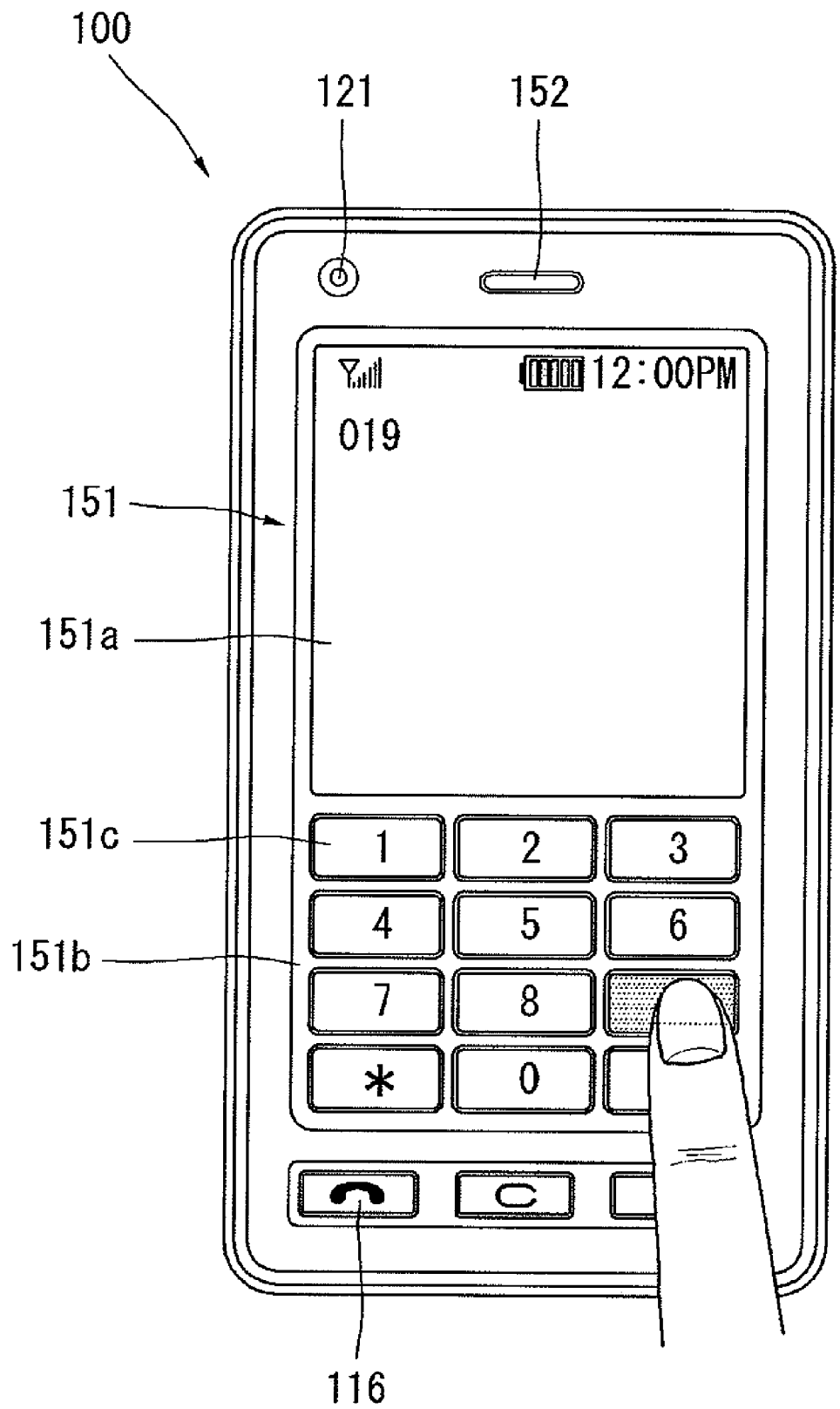
FIGS. 3A and 3B are front views of a mobile terminal illustrating one operating state of a mobile terminal according to an implementation of this document.
Figure 3B:
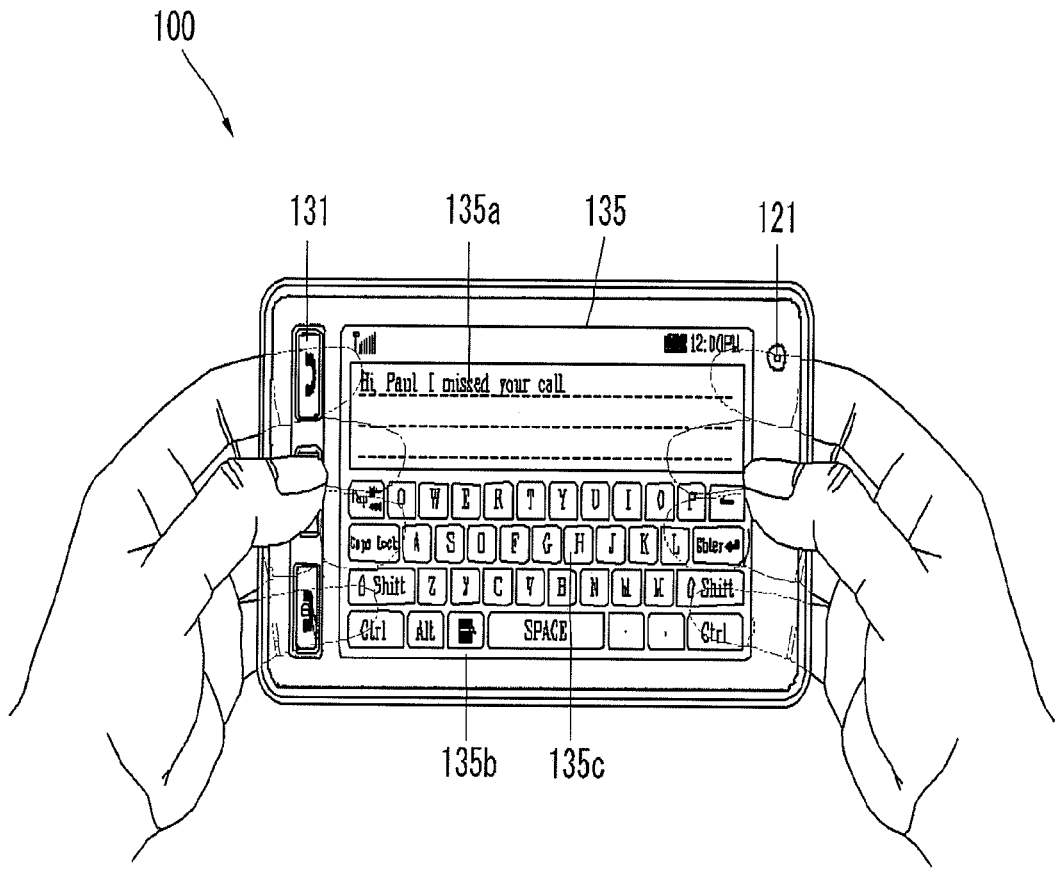

FIGS. 3A and 3B are front views of a mobile terminal illustrating one operating state of a mobile terminal according to an implementation of this document.

Various kinds of visual information is displayed in the display unit 151. The information can be displayed in a form such as a character, a numeral, a symbol, graphic, and an icon.

In order to input the information, at least one of the character, the numeral, the symbol, the graphic, and the icon may be displayed in a form of a keypad with a predetermined layout. The keypad is a so-called 'soft key'.

FIG. 3A illustrates the input of a touch applied to the soft key in a front surface of the terminal body.

The display unit 151 may be operated in an entire area, or be divided into a plurality of areas to be operated. In a case of the latter, the plurality of areas are operated to be related to each other.

For example, an output window 151a and an input window 151b are displayed in an upper part and a lower part of the display unit 151, respectively. Soft keys 151c in which numerals for inputting a phone number, etc. are displayed, are displayed in the input window 151b. When the soft key 151c is touched, numerals corresponding to the touched soft key 151c are displayed on the output window 151a. When the first manipulation unit 131 is manipulated, a call is connected to a phone number displayed on the output window 151a.

FIG. 3B illustrates an example of inputting a touch applied to the soft key 151c in the rear surface of the terminal body. FIG. 3A illustrates a portrait in which the terminal body is vertically disposed, and FIG. 3B illustrates a landscape in which the terminal body is horizontally disposed. The display unit 151 converts an output screen according to a disposition direction of the terminal body.

FIG. 3B illustrates an operation of a text input mode in the mobile terminal 100. The output window 135a and the input window 135b are displayed in the display unit 151. In the input window 135b, a plurality of soft keys 135c in which at least one of a character, a symbol, and a numeral is displayed are arranged. The soft keys 135c may be arranged in a QWERTY key layout.

If the soft keys 135c are touched through the touch pad 135, characters, numerals, and symbols corresponding to the touched soft keys are displayed on the output window 135a. Unlike when inputting a touch through the display unit 151, when inputting a touch through the touch pad 135, there is an advantage that the soft key 135c is not covered by a finger upon touching. When the display unit 151 and the touch pad 135 are transparently formed, fingers positioned at the rear surface of the terminal body can be checked with a user's eyes and thus a touch can be more accurately input.

The display unit 151 or the touch pad 135 as well as an input method described in the above-described implementations is formed to input a touch by a scroll. The user can move an object, for example, a cursor or a pointer positioned at an icon, displayed in the display unit 151 by scrolling the display unit 151 or the touch pad 135. Further, when the user's finger moves on the display unit 151 or the touch pad 135, the finger's moving path may be visually displayed in the display unit 151. This is useful when editing an image displayed in the display unit 151.

When the display unit 151 (touch screen) and the touch pad 135 are together touched within a predetermined time range, one function of the mobile terminal 100 may be executed. A case of being touched together comprises, for example, a case where the user clamps the terminal body using a thumb and a forefinger. The one function comprises, for example, activation or inactivation of the display unit 151 or the touch pad 135.

The proximity sensor 141 described with reference to FIG. 1 is described in detail with reference to FIG. 4.

Figure 4:
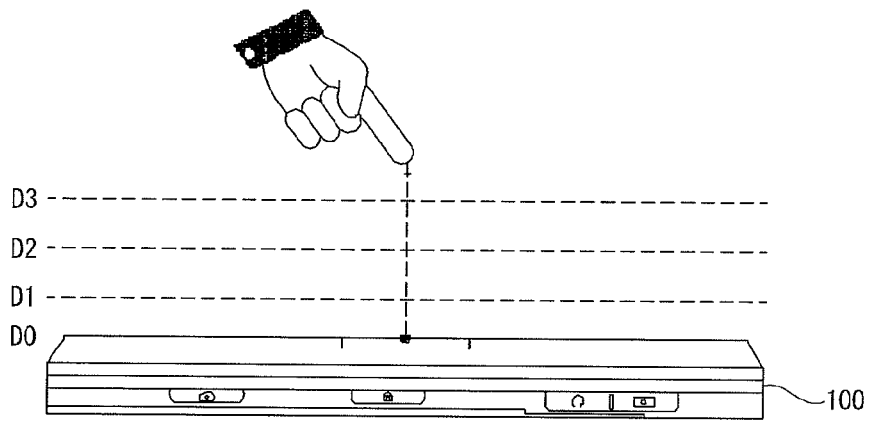
FIG. 4 is a conceptual diagram illustrating a proximity depth of a proximity sensor.

FIG. 4 is a conceptual diagram illustrating a proximity depth of the proximity sensor 141.

As shown in FIG. 4, when a pointer such as the user's finger approaches the touch screen, the proximity sensor 141 disposed within or around the touch screen detects the pointer and outputs a proximity signal.

The proximity sensor 141 outputs a different proximity signal according to a distance (hereinafter, referred to as a "proximity depth") between the adjacently touched pointer and the touch screen.

When the pointer approaches the touch screen, a distance in which the proximity signal is output is called a detection distance, by comparing proximity signals output from each proximity sensor using a plurality of proximity sensors having different detection distances, the proximity depth can be known.

FIG. 4 illustrates a cross-section of a touch screen in which the proximity sensors that can detect, for example, three proximity depths, are disposed. Proximity sensors that can detect less than three proximity depths or more than four proximity depths can be embodied.

Specifically, when the pointer is completely contacted on the touch screen (D0), this is recognized as a contact touch. When the pointer is positioned at a distance less than a distance D1 on the touch screen, this is recognized as a proximity touch of a first proximity depth. When the pointer is positioned at a distance from a distance more than the distance D1 to a distance less than a distance D2 on the touch screen, this is recognized as a proximity touch of a second proximity depth. When the pointer is positioned at a distance from a distance more than the distance D2 to a distance less than a distance D3 on the touch screen, this is recognized as a proximity touch of a third proximity depth. When the pointer is positioned at a distance more than the distance D3 on the touch screen, it is recognized that a proximity touch is released.

Therefore, the controller 180 recognizes the proximity touch as various input signals according to a proximity distance and a proximity position of the pointer relative to the touch screen and performs various operation control according to various input signals.

Hereinafter, implementations of this document are described. In the implementations of this document, for convenience of description, the display unit 151 is assumed as the touch screen 151. As described above, the touch screen 151 performs both an information display function and an information input function. A touch of this document is not limited to a proximity touch. A touch described hereinafter comprises both a proximity touch and a direct touch.

The memory unit 160 stores a scheduler. The scheduler provides a function of inputting or editing a schedule, a function of displaying a previously input schedule, and an alarm function of notifying a user of a schedule. Further, the scheduler provides a display function of a calendar and provides a function of inputting/editing/displaying a schedule through the calendar.

The scheduler provides various scheduler screens. Each scheduler screen comprises a time axis. The time axis may be clearly or virtually displayed on the each scheduler screen.

<Scroll of Scheduler Screen>

Figure 5:
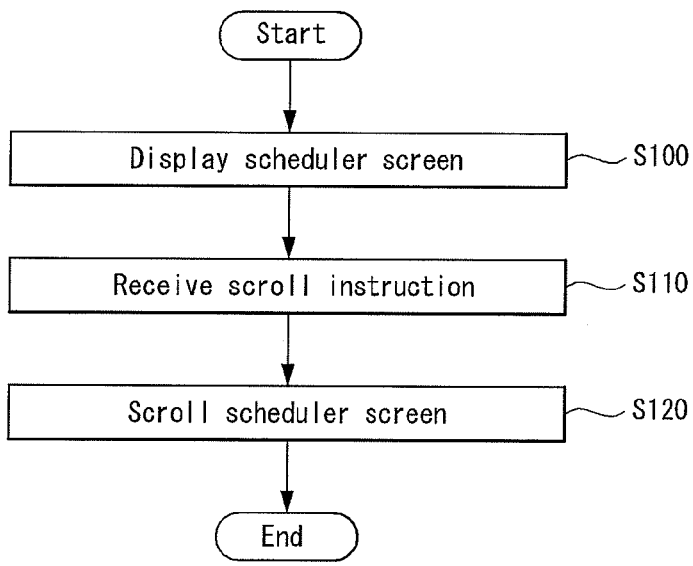
FIG. 5 is a flowchart illustrating a method of providing a scheduler in a mobile terminal according to a first implementation of this document.
Figure 6A:
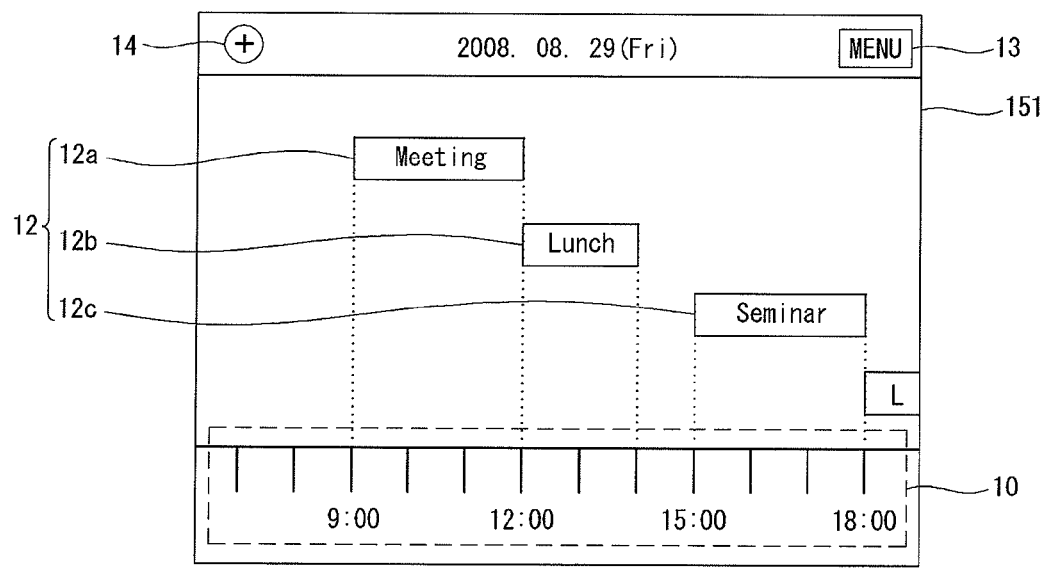
FIGS. 6A to 6D illustrate examples of screens for explaining a method of providing a scheduler in a mobile terminal according to a first implementation of this document.
Figure 6B:
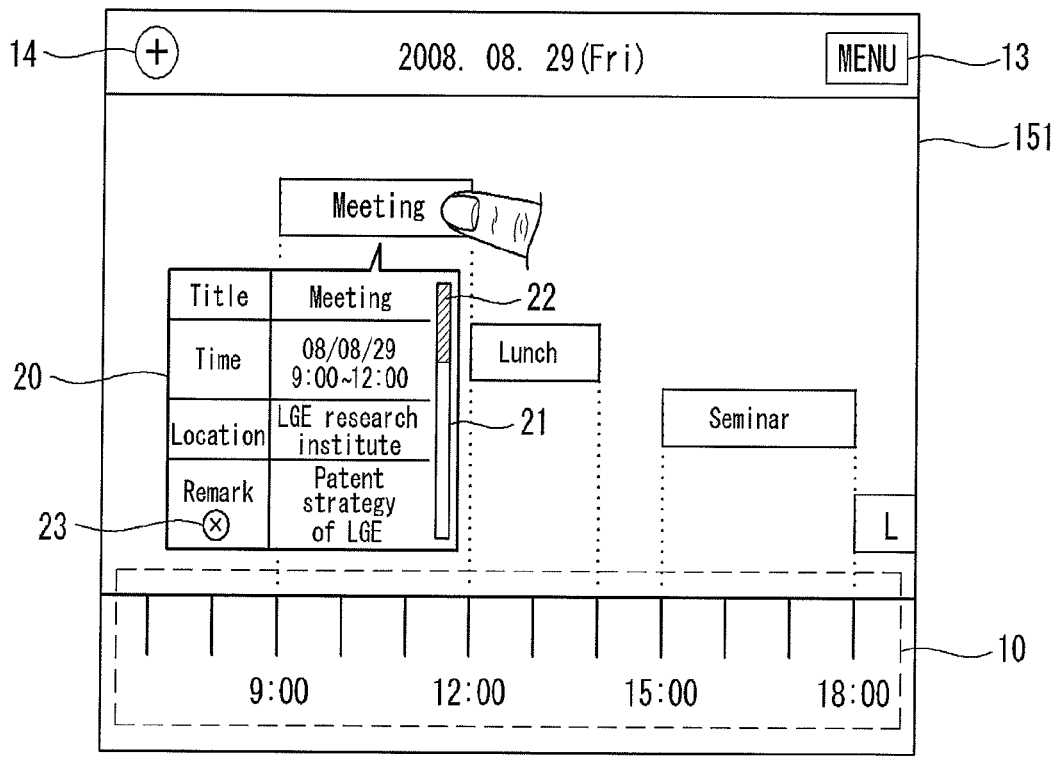
Figure 6C:
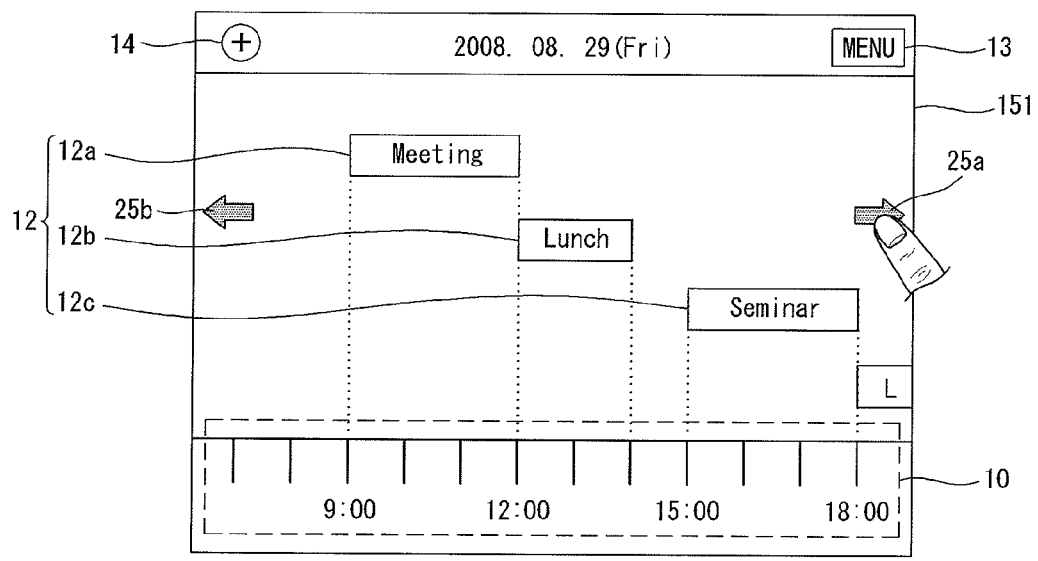
Figure 6D:
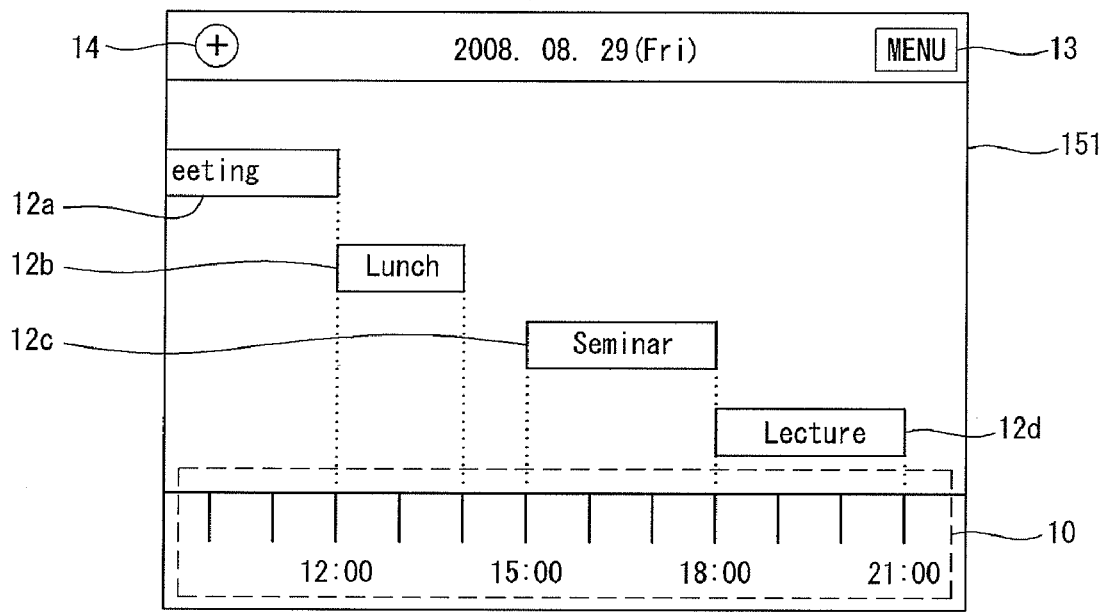

FIG. 5 is a flowchart illustrating a method of providing a scheduler in a mobile terminal according to a first implementation of this document. FIG. 6A is a diagram illustrating an example of performing step S100. FIG. 6B is a diagram illustrating an example of a screen for displaying detailed information of a specific schedule item. FIG. 6C is a diagram illustrating an example of performing step S110. FIG. 6D is a diagram illustrating an example of performing step S120.

The method of providing a scheduler in a mobile terminal according to a first implementation of this document can be performed in the mobile terminal 100 described with reference to FIGS. 1 to 4. Hereinafter, the method of providing a scheduler in a mobile terminal according to a first implementation of this document and operations of the mobile terminal 100 for performing the method will be described in detail with reference to FIG. 5 and other necessary drawings.

The controller 180 controls to display the scheduler screen on the touch screen 151 (S100).

FIG. 6A illustrates an example of the scheduler screen displayed at step S100. The scheduler screen shown in FIG. 6A displays a time axis 10 and previously input schedule items 12. A user can know a time range of each of the schedule items 12 through a relative position of the each of the schedule items 12 to the time axis 10. For example, a first schedule item 12a having a title "meeting" has a time range 'from 9 AM to 12 AM' on Aug. 29 (Friday), 2008. Further, for example, a second schedule item 12b having a title "lunch" has a time range 'from 12 AM to 2 PM' on Aug. 29, 2008.

Further, when the controller 180 controls to display at least one previously input schedule item on the scheduler screen, the controller 180 controls to display at least one text information corresponding to each of the at least one schedule item at a position corresponding to the each of the at least one schedule item, as shown in FIG. 6A and other drawings to be referred later. For example, text information of "meeting", "lunch", and "seminar" correspond to the first schedule item 12a, the second schedule item 12b, and the third schedule item 12C, respectively. The text information of "meeting", "lunch", and "seminar" is displayed at a position corresponding to schedule items corresponding thereto.

If the user presses an addition button 14 of a new schedule item on the scheduler screen shown in FIG. 6A, a schedule item input/edition screen that can add a new schedule item is displayed. Further, the scheduler screen may provide a menu button 13 for providing the scheduler and/or a menu of the mobile terminal 100.

When a specific schedule item of the schedule items 12 is selected, the controller 180 provides detailed information of the selected schedule item.

FIG. 6B is a diagram illustrating an example of providing detailed information of the first schedule item 12a.

For example, when the user touches an area in which the first schedule item 12a is displayed, the controller 180 controls to display a popup window 20 for providing detailed information related to the first schedule item 12a around an area in which the first schedule item 12a is displayed. When there is much information to provide through the popup window 20, the controller 180 provides scroll bars 21 and 22. The user can scroll information displayed within the popup window 20 by manipulating the scroll bars 21 and 22.

Further, when the user's touch is separated from an area in which the first schedule item 12a is displayed, the controller 180 controls to disappear the popup window 20 from the screen. Alternatively, when the user selects an end button 23 provided in the popup window 20, the controller 180 controls to disappear the popup window 20 from the screen.

The controller 180 receives a scroll instruction through the touch screen 151 (S110).

The scroll instruction can be received with various methods. For example, the scroll instruction may be a touch signal to a specific area within the touch screen 151 or the scheduler screen. For example, the controller 180 recognizes a touch signal to a predetermined area of the right side of the scheduler screen as an instruction of scrolling the scheduler screen to the right side. Further, for example, the controller 180 recognizes a touch signal to a predetermined area of the left side of the scheduler screen as an instruction of scrolling the scheduler screen to the right side.

Alternatively, the scroll instruction may be a movement signal of a touch to any point on the touch screen 151 or the scheduler screen, or a flicking signal. The movement of a touch may be, for example, a user's action in which the user moves a finger to another point without separating the finger from the touch screen 151 after touching a specific point of the touch screen 151 with the finger. The movement of the touch may be generally called a touch-and-drag operation. The flicking signal may be, for example, a signal for detecting an action in which the user bounces a finger in a specific direction after touching a specific point of the touch screen 151 with the finger. Alternatively, the scroll instruction may be a key signal received through a direction key provided in the user input unit 132.

FIG. 6C is a diagram illustrating an example of receiving a scroll instruction from the user. For example, when the user approaches a finger within a predetermined distance from the touch screen 151 without directly touching the touch screen 151 with the finger, scroll icons 25a and 25b for scrolling the screen can be displayed. The scroll icon 25a and 25b perform a function of notifying the user that the screen can be scrolled and of displaying an area for receiving a scroll instruction. For example, as shown in FIG. 6C, in order to scroll the screen to the right side, the user may touch the first scroll icon 25a with a finger at least one time, or for a predetermined time period.

The controller 180 controls to scroll the scheduler screen according to the received scroll instruction (S120).

FIG. 6D is a diagram illustrating an example in which the scheduler screen shown in FIG. 6C is scrolled to the right side. For example, referring to FIGS. 6C and 6D, the controller 180 controls to scroll the scheduler screen to the right side according to the reception number of times or a sustain time period of a touch signal received through an area in which the first scroll icon 25a is displayed.

<Zoom-In/Zoom-Out of Scheduler Screen>

Figure 7:
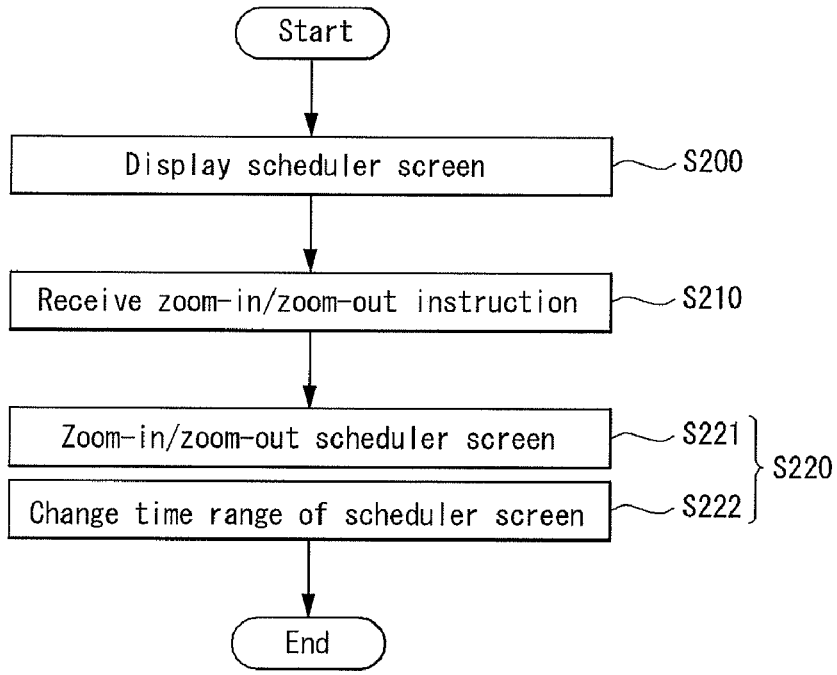
FIG. 7 is a flowchart illustrating a method of providing a scheduler in a mobile terminal according to a second implementation of this document.
Figure 8A:
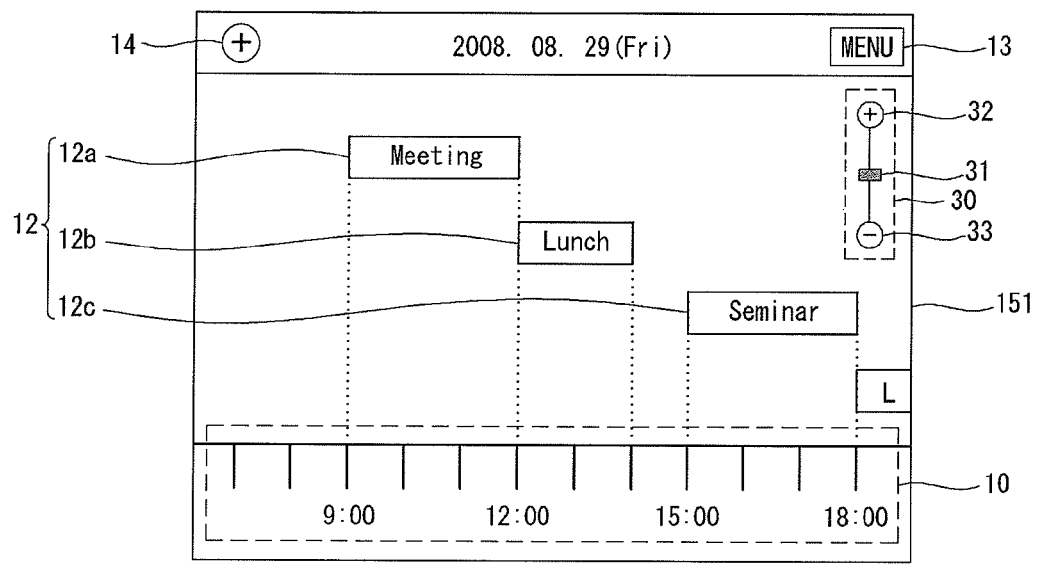
FIGS. 8A to 8E, 9, 10A, and 10B illustrate examples of screens for explaining a method of providing a scheduler in a mobile terminal according to a second implementation of this document.
Figure 8B:
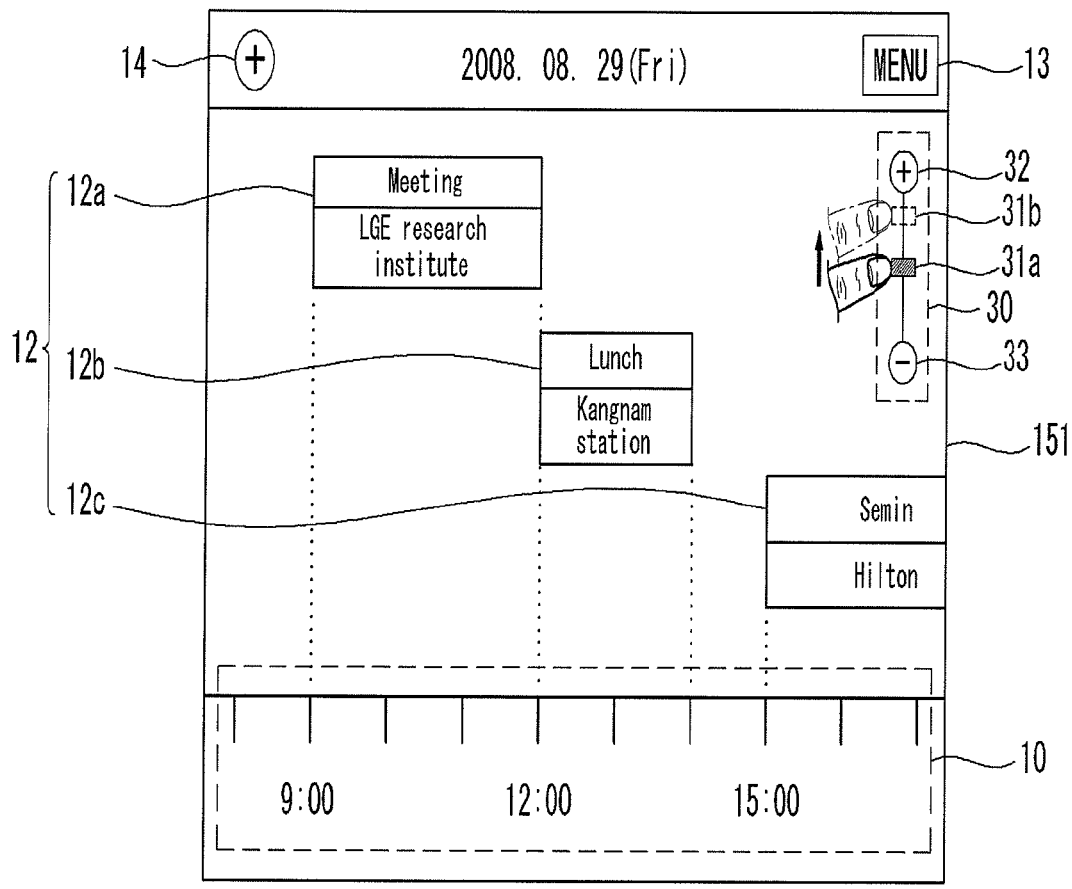
Figure 8C:
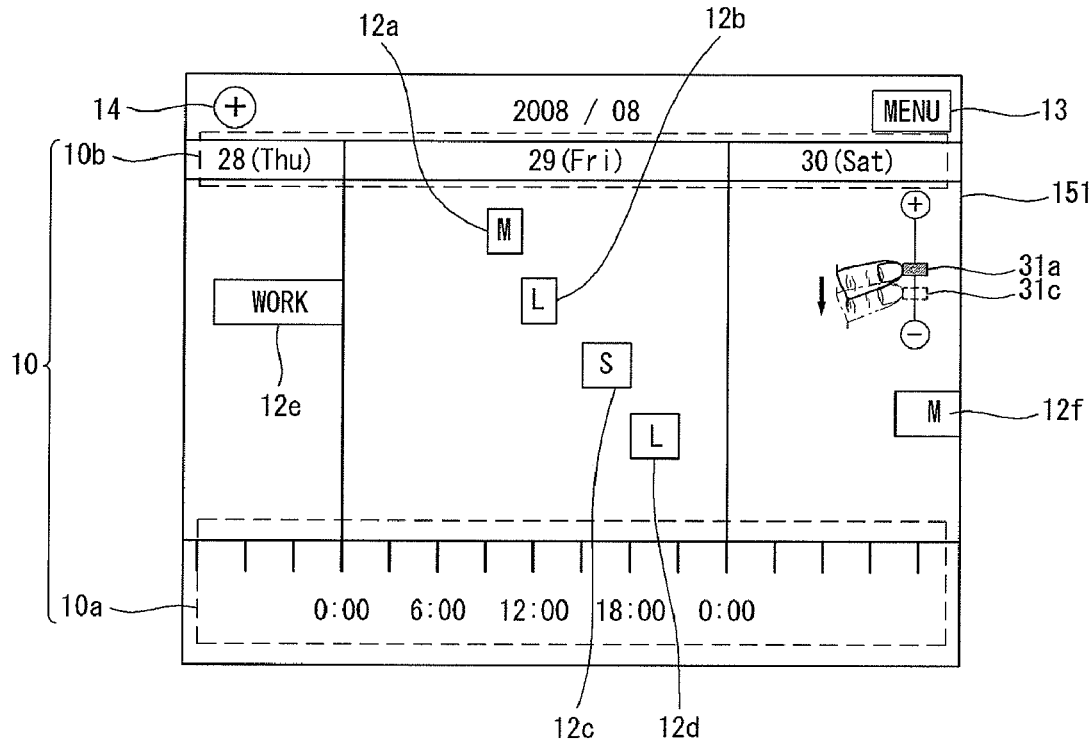
Figure 8D:
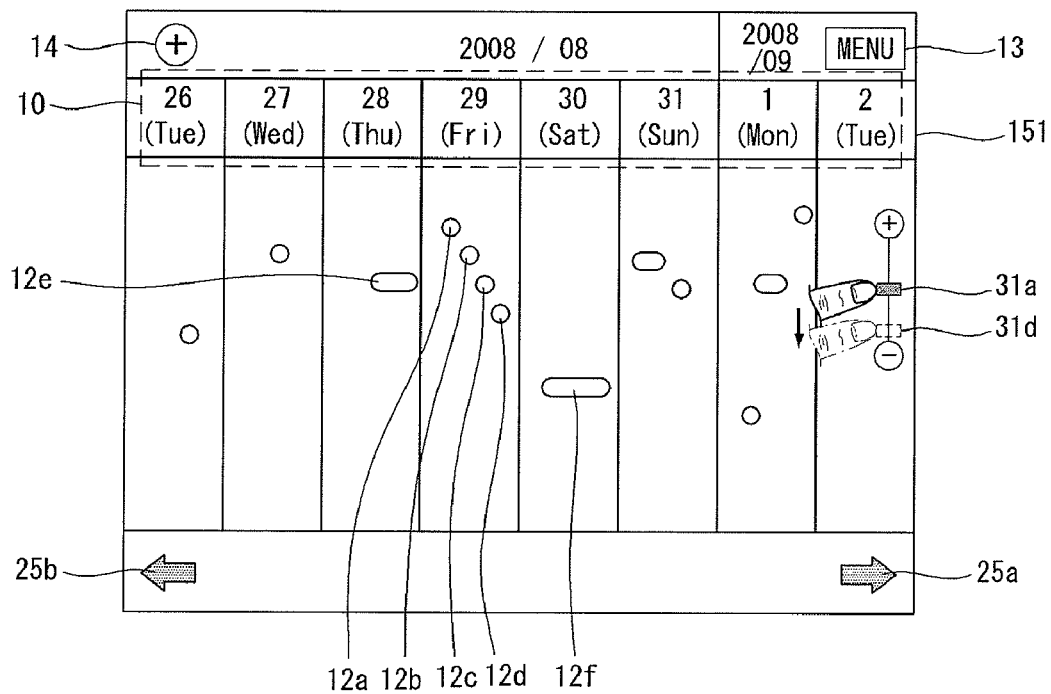
Figure 8E:
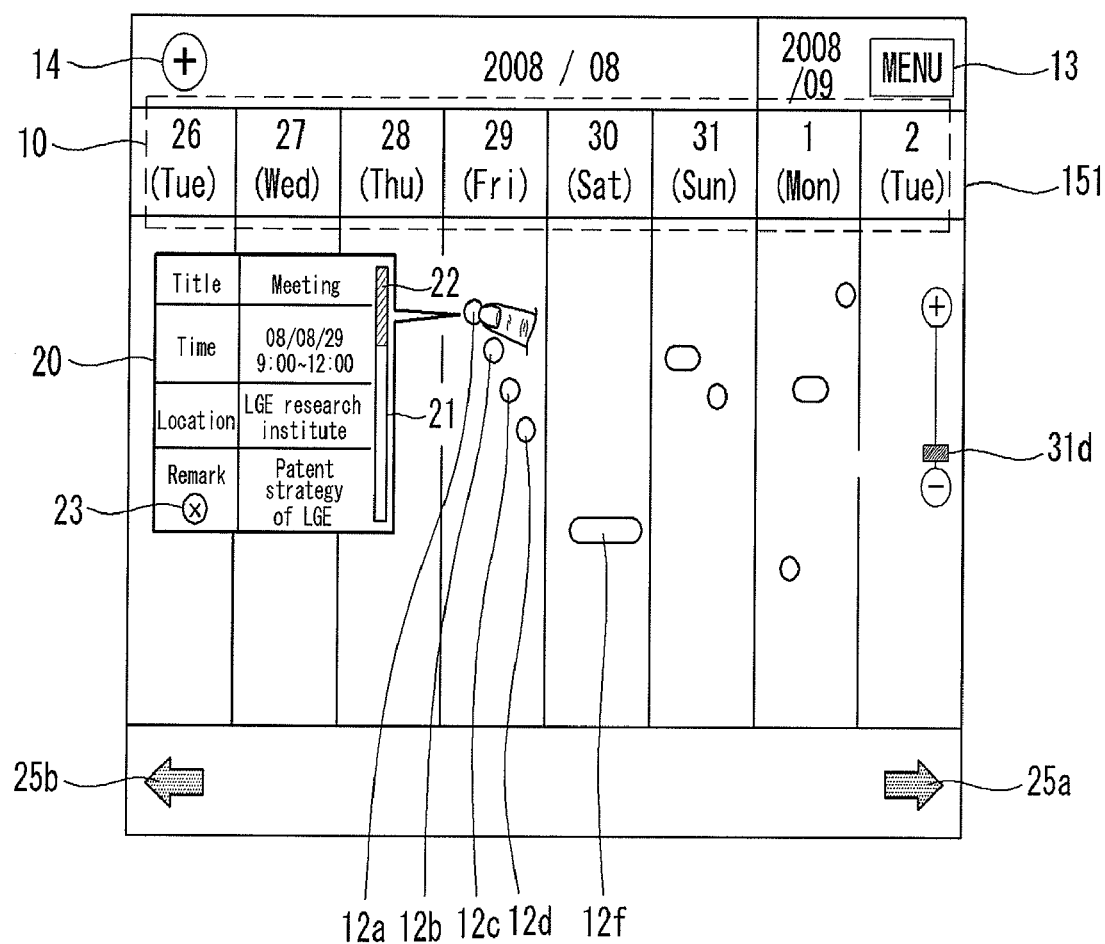
Figure 9:
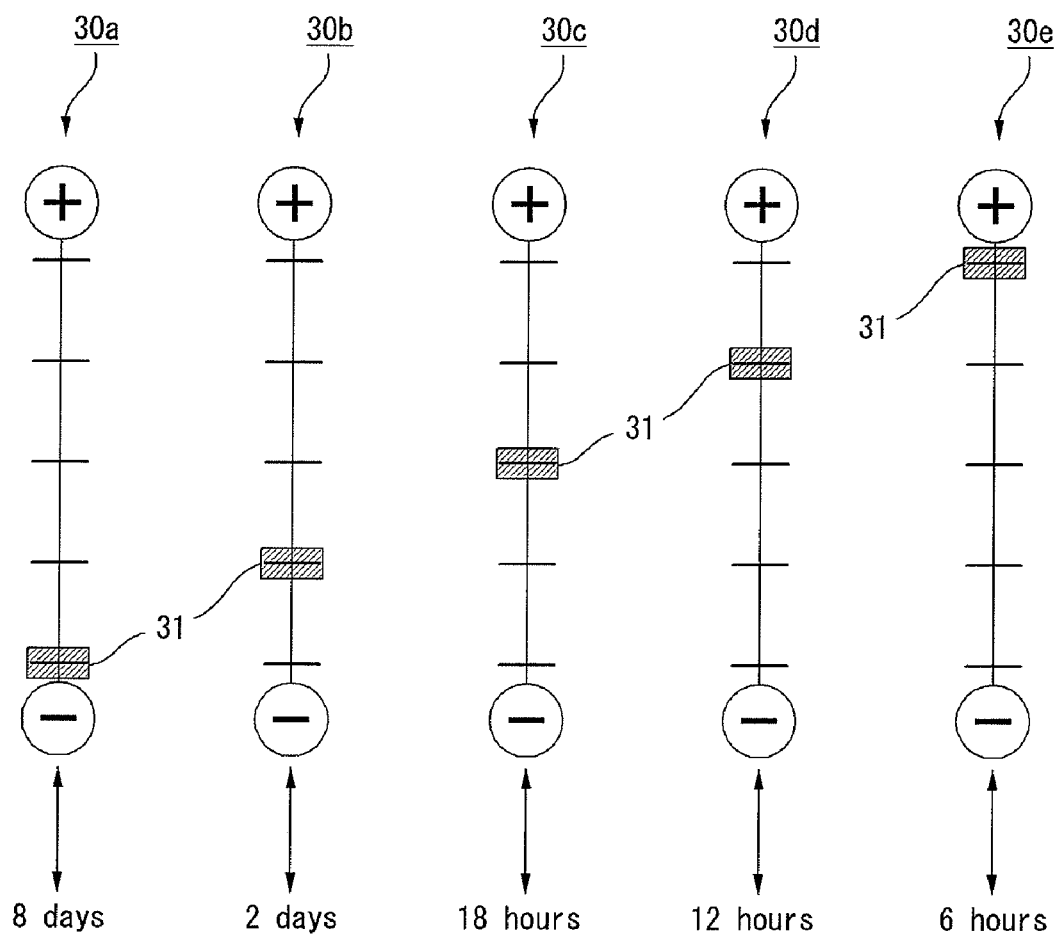
Figure 10A:
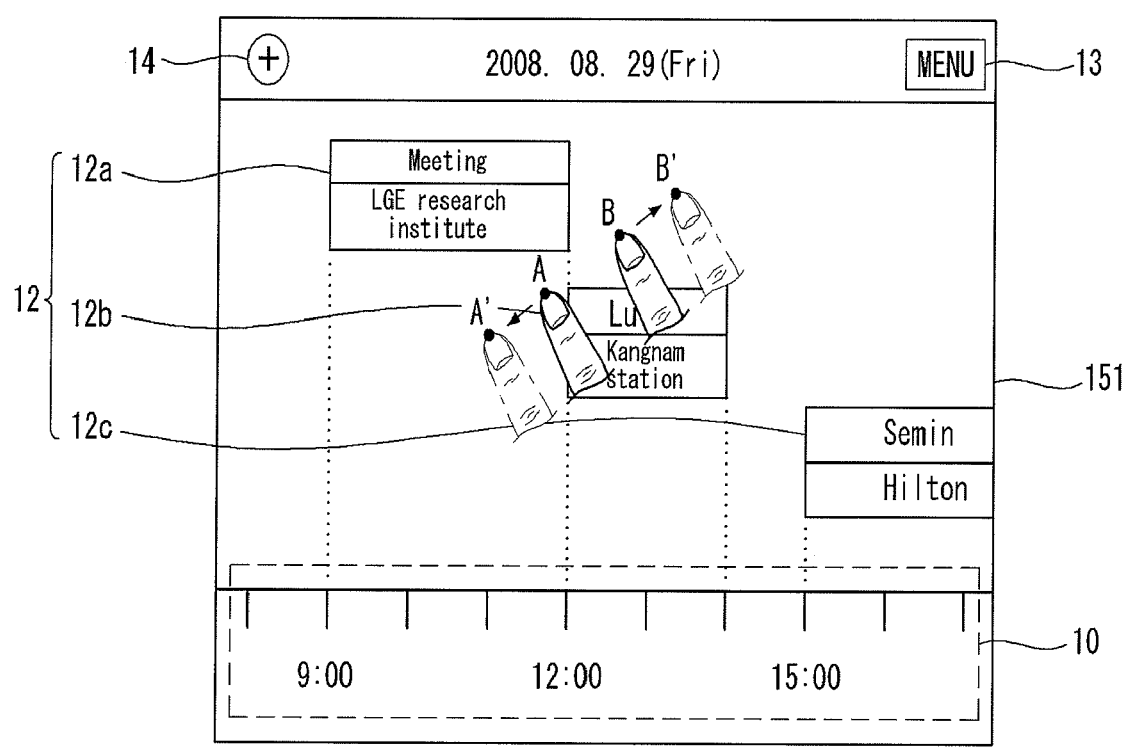
Figure 10B:
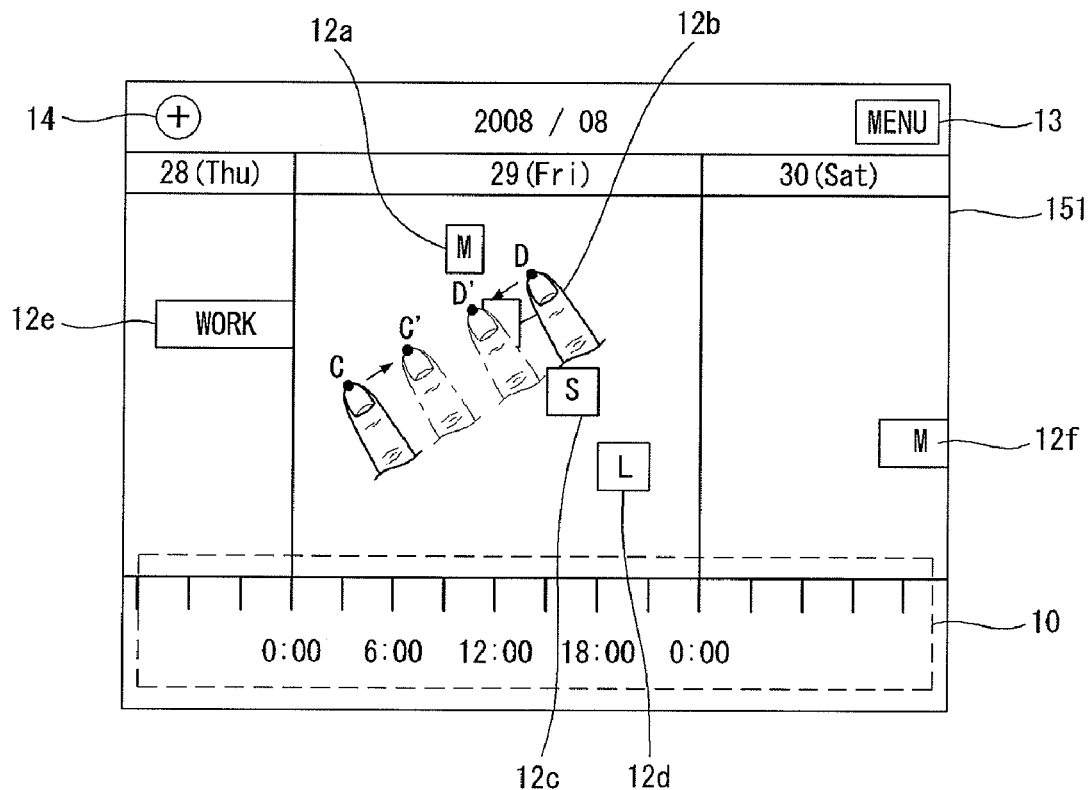

FIG. 7 is a flowchart illustrating a method of providing a scheduler in a mobile terminal according to a second implementation of this document. FIG. 8A is a diagram illustrating an example of performing step S200. FIGS. 8B to 8D are diagrams illustrating an example of performing steps S210 and S220 using a zoom control bar 30. FIG. 8E is a diagram illustrating an example of a screen for displaying detailed information of a specific schedule item of FIG. 8D. FIG. 9 is a diagram illustrating the relationship between a time range of the scheduler screen and the zoom control bar 30 shown in FIGS. 8A to 8E. FIGS. 10A and 10B are diagrams illustrating examples of performing steps S210 and S220 using a multi-touch.

The method of providing a scheduler in the mobile terminal according to a second implementation of this document can be performed in the mobile terminal 100 described with reference to FIGS. 1 to 4. Hereinafter, the method of providing a scheduler in the mobile terminal according to a second implementation of this document and operations of the mobile terminal 100 for performing the method will be described in detail with reference to FIG. 7 and other necessary drawings.

The controller 180 controls to display the scheduler screen on the touch screen 151 (S200).

For example, referring to FIG. 8A, the controller 180 controls to display a scheduler screen comprising the zoom control bar 30 on the touch screen 151. The scheduler screen shown in FIG. 8A may be equal to the scheduler screen shown in FIG. 6A, except for the zoom control bar 30. The zoom control bar 30 is a kind of indicator for representing zoom-in or zoom-out of the scheduler screen. The zoom control bar 30 can receive the user's touch signal for zooming-in or zooming-out the scheduler screen through an area in which the zoom control bar 30 is displayed while notifying the user that the scheduler screen can be zoomed-in or zoomed-out.

As shown in FIG. 8A, the zoom control bar 30 comprises a zoom adjuster 31 that can be moved within the zoom control bar 30, a zoom-in icon 32 for representing zoom-in, and a zoom-out icon 33 for representing zoom-out. The user can zoom-in or zoom-out the scheduler screen by manipulating the zoom adjuster 31 with a finger. Further, the user can zoom-in and the zoom-out the scheduler screen by manipulating the zoom-in icon 32 and the zoom-out icon 33, respectively.

The controller 180 receives a zoom-in or zoom-out instruction (S210), and the controller 180 changes a time range of the scheduler screen while zooming-in or zooming-out the scheduler screen displayed at step S200 according to the received zoom-in or zoom-out instruction (S220).

The zoom-in or zoom-out instruction may have various forms. For example, the zoom-in or zoom-out instruction may be a touch or movement of the touch to the indicator displayed on the touch screen 151 or the scheduler screen. For example, the controller 180 may recognize the user's touch signal to an area in which the zoom control bar 30 is displayed as the zoom-in or zoom-out instruction. Specifically, referring to FIGS. 8A to 8D, the user can transfer the zoom-in or zoom-out instruction to the controller 180 by vertically moving (movement of a touch or touch-and-drag) the zoom adjuster 31 in a state of touching the zoom adjuster 31 with a finger. Further, the user can transfer the zoom-in or zoom-out instruction to the controller 180 by touching the zoom-in icon 32 or the zoom-out icon 33 with a finger.

Further, for example, the zoom-in or zoom-out instruction may be movement of touches to two different points of the touch screen. The touches to two different points of the touch screen are generally called a multi-touch. Specifically, referring to FIGS. 10A and 10B, when the user drags two fingers to other points A' and B' while sustaining a contact with the touch screen 151 after simultaneously touching two points A and B on the scheduler screen with the two fingers, respectively (see FIG. 10A), the zoom-in instruction is transferred to the controller 180. Further, when the user drags two fingers to other points C' and D' while sustaining a contact after simultaneously touching two points C and D with the two fingers, respectively (see FIG. 10B), the zoom-out instruction is transferred to the controller 180. Further, for example, the zoom-in or zoom-out instruction may be a key signal through a key button provided in the user input unit 130. A time range of the scheduler screen is an entire time range that can be displayed on the scheduler screen. For example, the user can know a time range displayed on the scheduler screen through a date and the time axis 10 displayed on the scheduler screen.

The controller 180 controls to zoom-in or zoom-out the scheduler screen in order to change a time range of the scheduler screen according to the zoom-in or zoom-out instruction.

For example, referring to FIGS. 8A and 8B, when the user moves upward the zoom adjuster 31 by a predetermined distance using a finger, the controller 180 controls to zoom-in the scheduler screen by a ratio corresponding to a distance in which the zoom adjuster 31 is moved upward.

FIG. 8B illustrates an example in which the scheduler screen is zoomed-in while a time range of the scheduler screen reduces as the zoom adjuster 31 moves from a first position 31*a* to a second position 31*b*. FIGS. 8A and 8B illustrate cases where the zoom adjuster 31 is positioned at the first position 31*a* and the second position 31*b*, respectively.

Further, for example, referring to FIG. 8C, when the user moves downward the zoom adjuster 31 by a predetermined distance using a finger, the controller 180 controls to zoom-out the scheduler screen by a ratio corresponding to a distance in which the zoom adjuster 31 is moved downward.

FIG. 8C illustrates an example in which the scheduler screen is zoomed-out while a time range of the scheduler screen extends as the zoom adjuster 31 moves from the first position 31*a* to a third position 31*c*.

Further, referring to FIG. 8D, when the user moves the zoom adjuster 31 to a fourth position 31*d* lower than the third position 31*c*, the scheduler screen has a time range greater than that when the zoom adjuster 31 is positioned at the third position 31*c* and thus the scheduler screen can be further zoomed-out. For example, the scheduler screen shown in FIG. 8C has a time range of about 24 hours, however a scheduler screen shown in FIG. 8D has a time range of about 8 days. In FIG. 8D, as a time range of the scheduler screen extends, detailed information of each schedule item may not be displayed due to a size limitation of the screen. In this case, when the user performs a touch (or a proximity touch) of a specific schedule item, the controller 180 controls to display detailed information of the touched specific schedule item, as shown in FIG. 8E.

In this way, the controller 180 controls magnification of zoom-in or zoom-out according to a position of the zoom adjuster 31. FIG. 9 shows that a position of the zoom adjuster 31 and a time range of the scheduler screen may variously correspond to each other. Various states 30*a* to 30*e* of the zoom control bar 30 according to different positions of the zoom adjuster 31 correspond to different time ranges. The controller 180 controls the scheduler screen to have a time range corresponding to a position of the zoom adjuster 31.

Further, for example, referring to FIGS. 10A and 10B, as the user moves a multi-touch to two points on the touch screen 151 or the scheduler screen, the controller 180 controls to zoom-in (see FIG. 10A) or zoom-out (see FIG. 10B) the scheduler screen while changing a time range of the scheduler screen by a ratio corresponding to a movement distance of the multi-touch.

When the time range of the scheduler screen extends according to the zoom-in or zoom-out of the scheduler screen, the controller 180 controls to display only a part of at least one text information displayed on the scheduler screen, or to display the at least one text information with an icon. When only a part of the at least one text information is displayed, the display can be variously performed. For example, according to an importance level that is set when the user inputs a schedule item, only text information corresponding to a schedule item having a high importance level can be displayed. Further, for example, a part of each of the at least one text information can be displayed. In FIG. 8C, all text information corresponding to all schedule items 12 is displayed, only first characters of corresponding titles are displayed. In FIG. 8C, reference numerals 12*a* to 12*d* may be icons. Referring to FIG. 8D, if a time range of the scheduler screen is greater than a predetermined threshold value, text information may not be displayed on the scheduler screen.

When the time range of the scheduler screen reduces according to the zoom-in or zoom-out of the scheduler screen, the controller 180, the controller 180 increases a quantity of text information corresponding to a specific schedule item displayed on the scheduler screen. For example, in a case of FIG. 8B, a quantity of text information displayed to correspond to each schedule item can increase, compared with a case of FIG. 8A. The kind of additionally displayed text information can be variously set. In the case of FIG. 8B, the additionally displayed text information is "location" information comprised in the each schedule item. For example, the first schedule item shown in FIG. 8B displays that a schedule of "meeting" (title or category) at "LGE research institute" (location) exists "from 8 AM to 12 AM" (time range).

<Setting/Updating of Time Range of Schedule Item>

Figure 11:
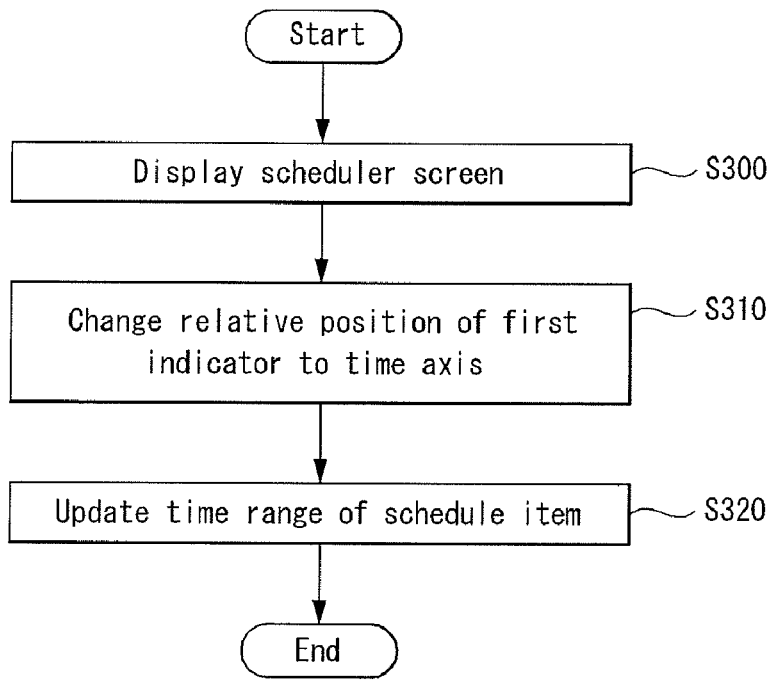
FIG. 11 is a flowchart illustrating a method of providing a scheduler in a mobile terminal according to a third implementation of this document.
Figure 12A:
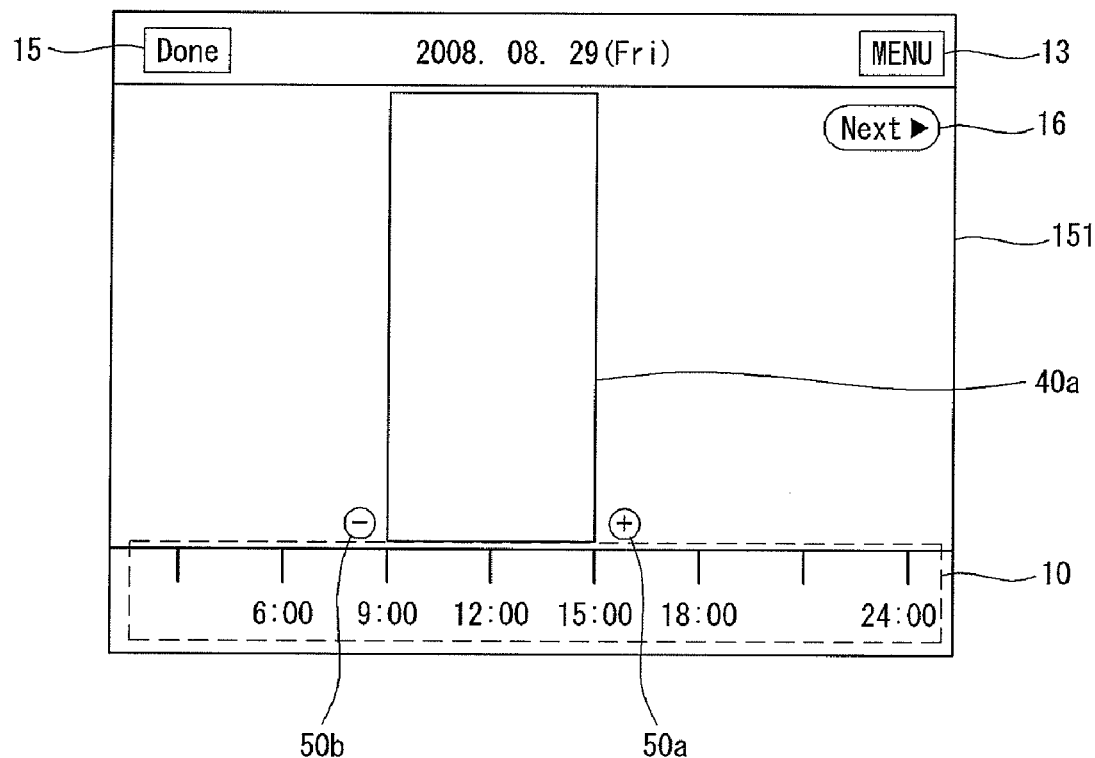
FIGS. 12A to 12D, 13A to 13E, 14A, and 14B illustrate examples of screens for explaining a method of providing a scheduler in a mobile terminal according to a third implementation of this document.

FIG. 11 is a flowchart illustrating a method of providing a scheduler in a mobile terminal according to a third implementation of this document. FIGS. 12A and 13B are diagrams illustrating an example of performing step S300. FIGS. 12B to 12D, 13A to 13E, 14A, and 14B are diagrams illustrating examples in which steps S310 and S320 are performed with various methods. FIGS. 15A to 15D are diagrams illustrating examples in which a date change of a scheduler screen is performed with various methods.

The method of providing a scheduler in a mobile terminal according to a third implementation of this document can be performed in the mobile terminal 100 described with reference to FIGS. 1 to 4. Hereinafter, the method of providing a scheduler in the mobile terminal according to a third implementation of this document and operations of the mobile terminal 100 for performing the method will be described in detail with reference to FIG. 11 and other necessary drawings.

The controller 180 controls to display a scheduler screen comprising a first indicator for representing a time range of any schedule item and a time axis 10 on the touch screen 151 (S300). The scheduler screen displayed at step S300 can provide at least one of a function of inputting a new schedule item and a function of displaying at least one previously input schedule item. For example, FIG. 12A is a scheduler screen for inputting a new schedule item, and FIG. 13B is a scheduler screen for displaying previously input schedule items. The scheduler screen displayed at step S300 may be various scheduler screens in which the scheduler provides.

The scheduler screen shown in FIG. 12A may be a screen for setting a time range of a new schedule item. The scheduler screen displays a first indicator 40*a* for representing a time range of the new schedule item. When the user touches a step button 16 for advancing to a next step after determining a time range of the new schedule item, a scheduler screen for inputting other information (for example, a location and a content) necessary for setting a new schedule item is displayed. Further, other information may be input without a screen change on the scheduler screen shown in FIG. 12A.

The first indicator comprised in the scheduler screen displayed at step S300 may have various forms. For example, the first indicator may be indicators 40*a*, 40*b*, and 40*c* shown in FIGS. 12A to 12D, or indicators 41*a* and 41*b* shown in FIG. 13A. Further, in FIG. 13B, the first indicator may be the schedule items 12. For example, in FIG. 13B, because the first schedule item 12*a* represents a time range from 9 AM to 12 AM, the first schedule item 12*a* may be the first indicator.

The controller 180 changes a relative position of the first indicator to the time axis 10 according to the user's instruction (S310) and updates the time range of the schedule item according to a change of the relative position of the first indicator (S320).

The first indicator can change the relative position with various methods. For example, the first indicator can change the relative position by movement of a touch to the first indicator.

Figure 12B:
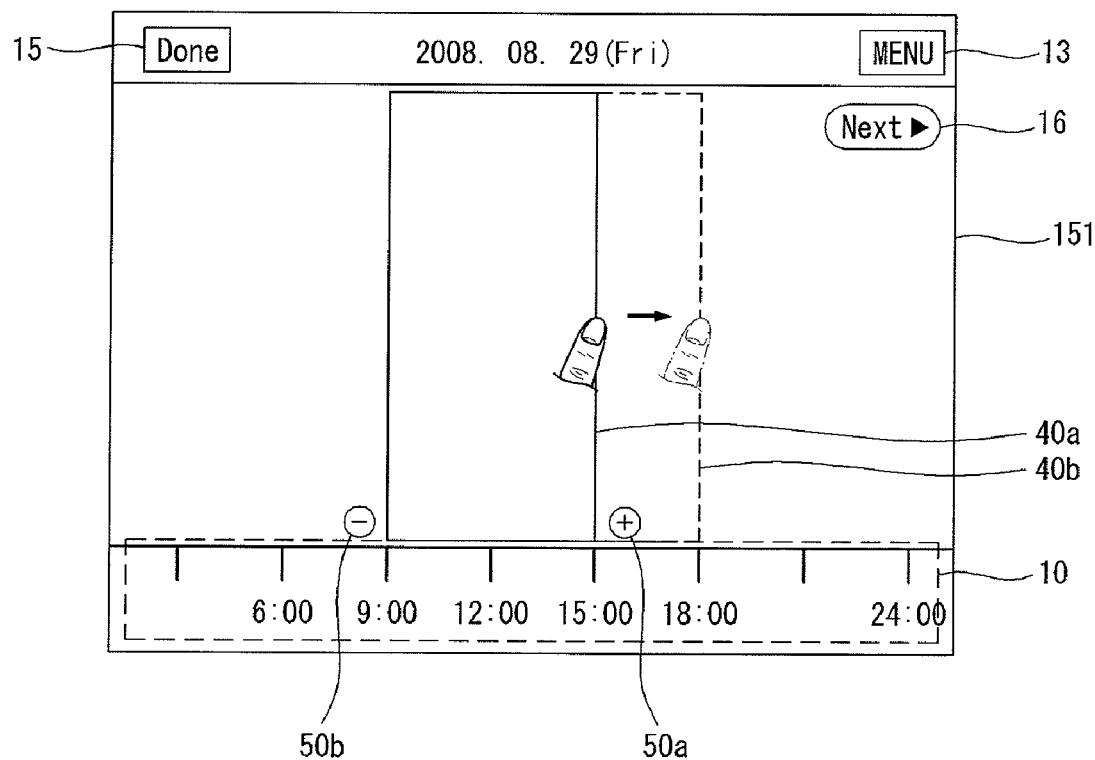

FIG. 12B illustrates an example of changing the relative position by movement of a touch to the first indicator.

Referring to FIG. 12B, when the user touches and drags the border of one side of the first indicator 40*a* to the right side with a finger, the one side border of the first indicator 40*a* is moved to the right side. As the one side border of the first indicator 40*a* is moved to another position 40*b*, a relative position of the first indicator 40*a* to the time axis 10 changes and a time range of a new schedule item represented by the first indicator 40*a* is updated.

Further, for example, the relative position of the first indicator can be changed by a touch to a predetermined area or movement of the touch on the scheduler screen. The controller 180 controls to display a predetermined graphic element at a position corresponding to the predetermined area. First and second movement icons 50*a* and 50*b* provided in FIGS. 12A to 12D are the graphic element.

Figure 12C:
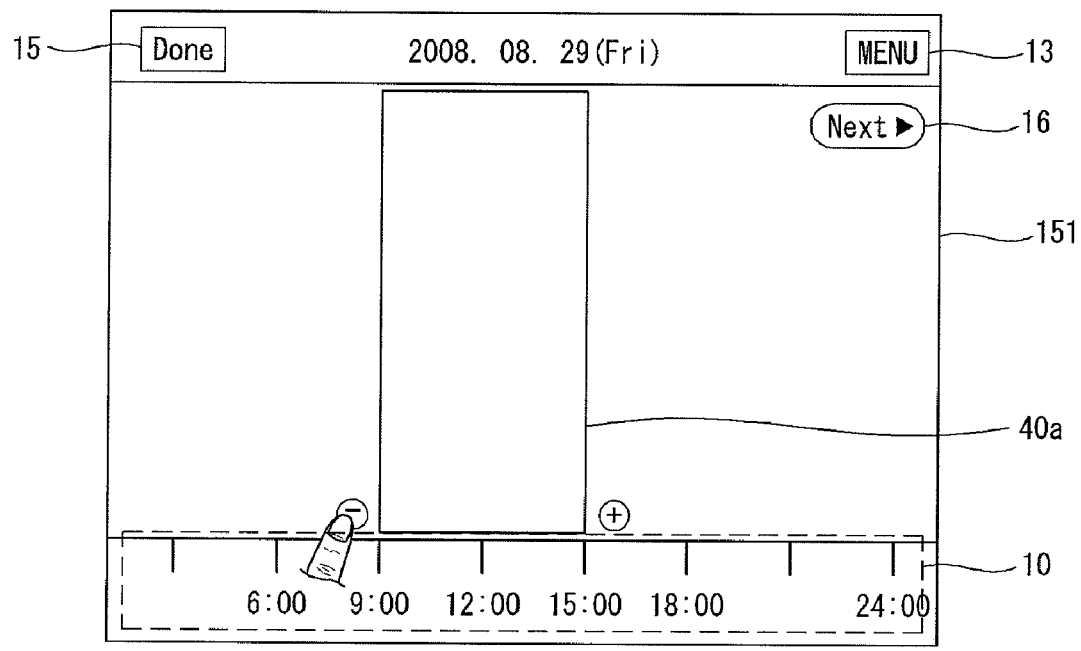
Figure 12D:
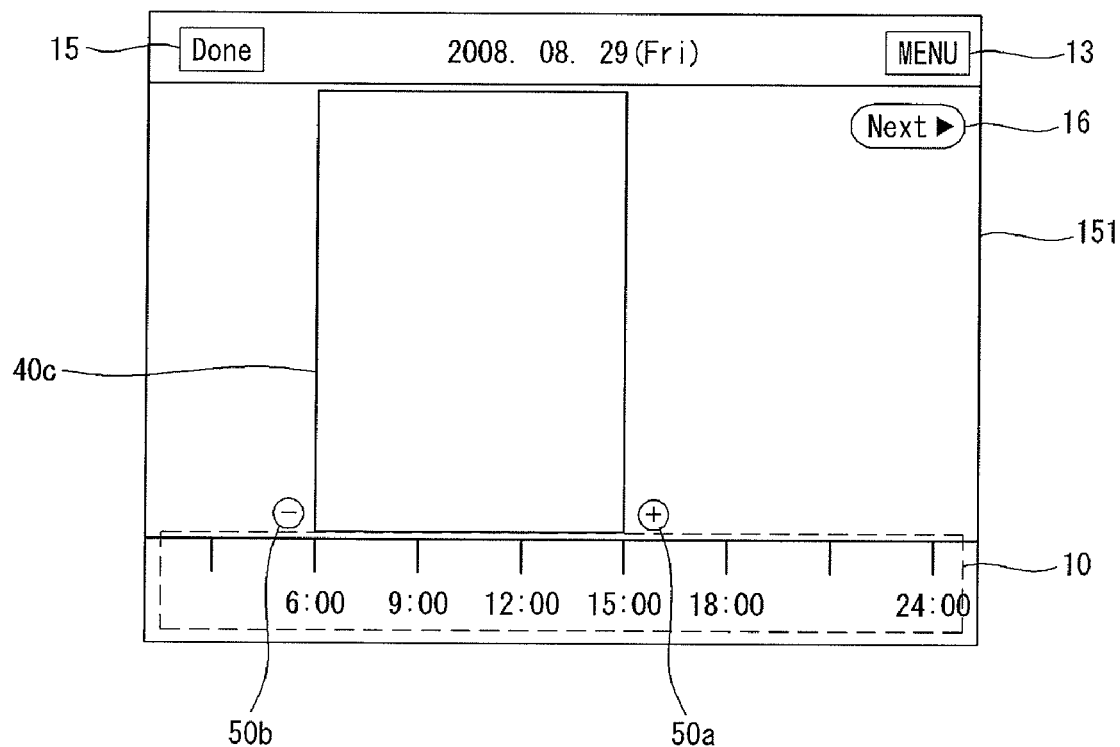

Referring to FIGS. 12C and 12D, as the user touches the first and second movement icons 50*a* and 50*b* provided on the scheduler screen, a time range of the new schedule item is updated while a relative position of the first indicator 40*a* to the time axis changes. In a state of FIG. 12C, when the user touches the second movement icon 50*b* a predetermined number of times or for a predetermined time period, the left border of the first indicator 40*a* is moved to the left side and thus a time range of the new schedule item changes, as shown in FIG. 12D. The touch number of times to the second movement icon 50*b* and a movement distance of the left border of the first indicator 40*a* variously correspond to each other. For example, a movement distance of the left border of the first indicator 40*a* relative to one time touch to the second movement icon 50*b* may be one hour to the left side. A movement distance to the right side of the right border of the first indicator 40*a* relative to one time touch to the first movement icon 50*a* may be also variously set.

Hereinafter, various implementations of the first indicator 40*a* and steps S310 and S320 will be described.

Figure 13A:
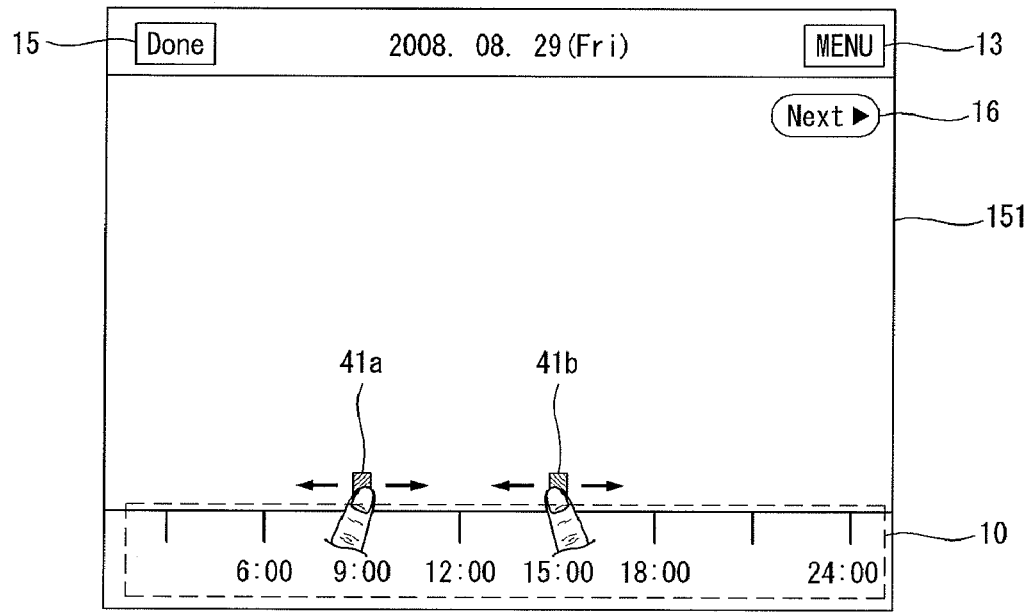
Figure 13B:
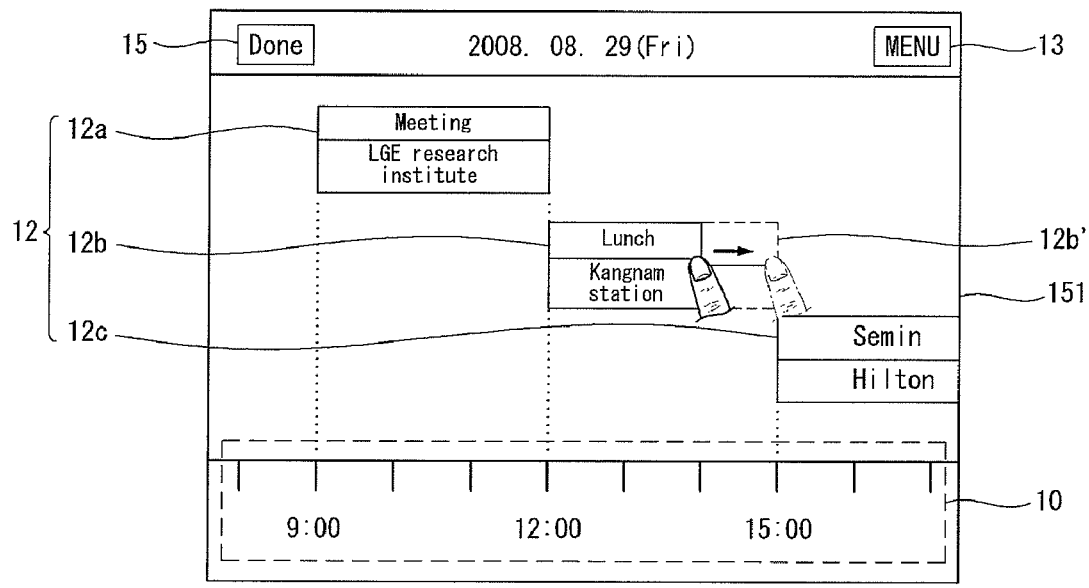

FIG. 13A illustrates another form of first indicators 41*a* and 41*b*. The user can update and set a time range of the new schedule item by laterally moving the first indicators 41*a* and 41*b* shown in FIG. 13A.

As described above, FIG. 13B illustrates a case where a previously input schedule item is the first indicator. For example, referring to FIG. 13B, the user allows the right border of the second schedule item 12*b'* to position at '15:00' by dragging a finger to the right side after touching the right border of the second schedule item 12*b* with the finger. Accordingly, the controller 180 updates a termination time point of the second schedule item from 2 PM to 3 PM.

Figure 13C:
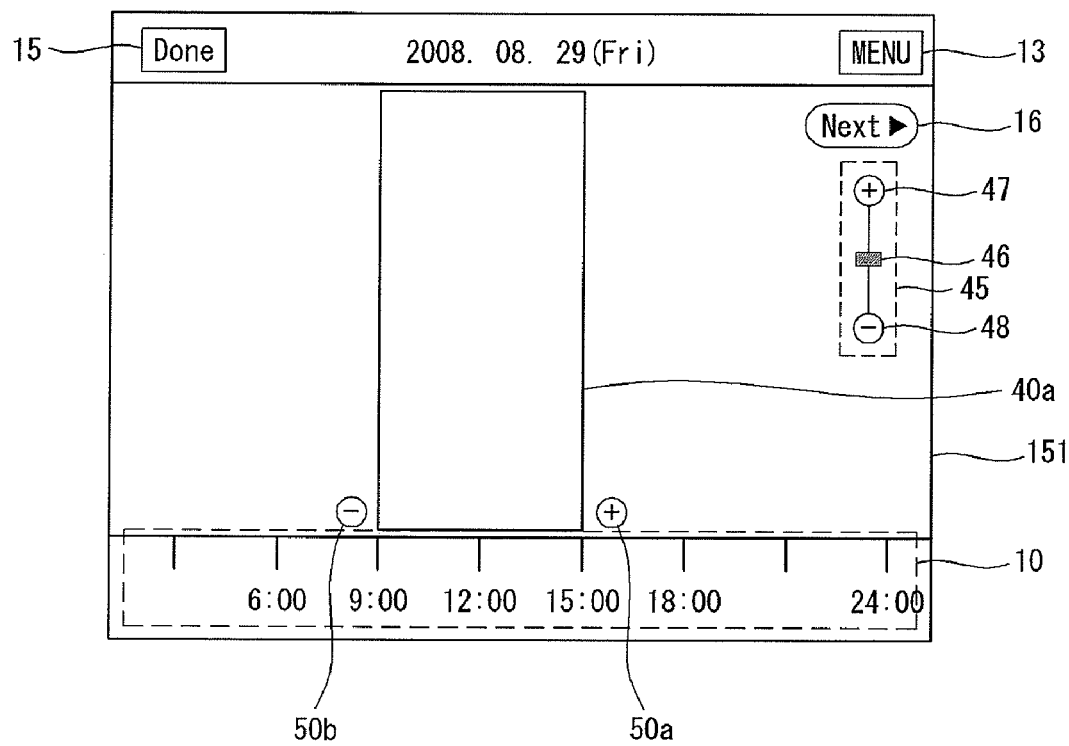
Figure 13D:
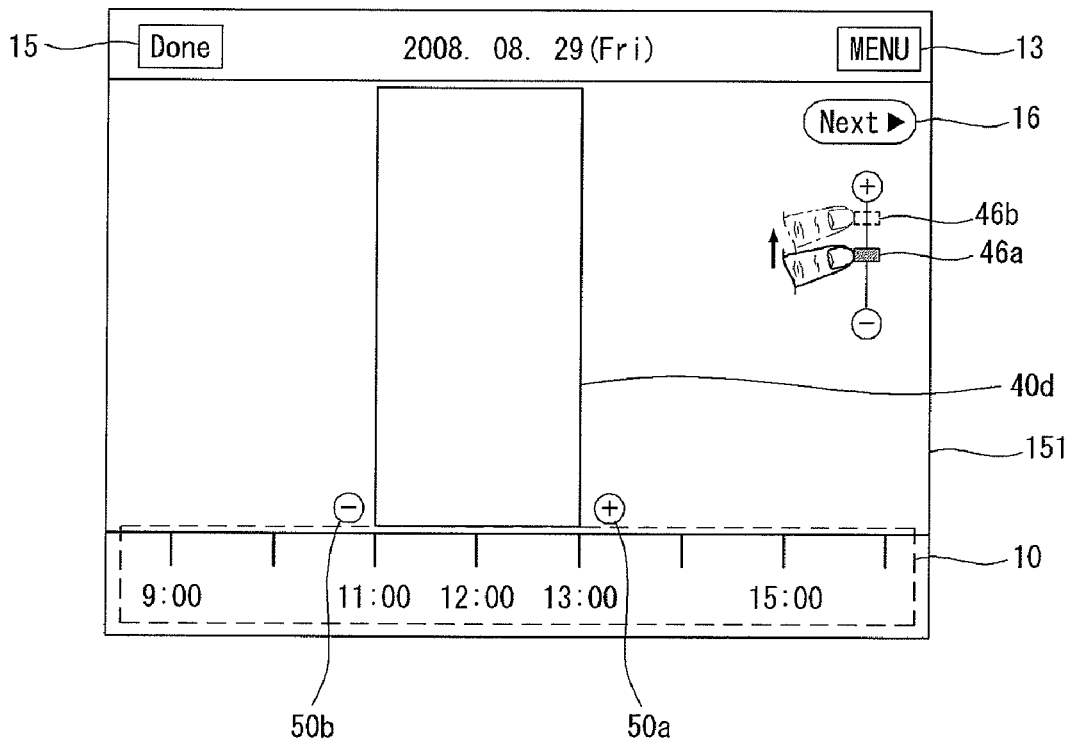

FIGS. 13C and 13D illustrate examples of applying the second implementation of this document to the third implementation. For example, the scheduler screen displayed at step S300 comprises a zoom control bar 45, as shown in FIG. 13C. The zoom control bar 45 is similar to the zoom control bar 30 described in the second implementation of this document. That is, as shown in FIGS. 13C and 13D, the zoom control bar 45 comprises a zoom adjuster 46 that can be moved within the zoom control bar 45, a zoom-in icon 47 for representing zoom-in, and a zoom-out icon 48 for representing zoom-out. The user can zoom-in or zoom-out an entire time range of the time axis 10 by manipulating the zoom adjuster 46 with a finger. Further, the user can zoom-in or zoom-out an entire time range of the time axis 10 by manipulating the zoom-in icon 47 and the zoom-out icon 48, respectively.

As the user manipulates the zoom adjuster 46, the zoom-in icon 47, and the zoom-out icon 48, an entire time range of the time axis 10 is zoomed-in or zoomed-out and thus a time range of the scheduler screen changes. In this case, the controller 180 changes only the time range of the time axis 10 and does not change an absolute position of the first indicator 40*a*. A relative position of the first indicator 40*a* to the time axis 10 changes by a change of the time range of the time axis 10. This is because a relative position of the first indicator 40*a* to the time axis 10 comprises a time concept.

FIG. 13D illustrates a change of the time range represented by the first indicator 40*a*. When the user moves the zoom adjuster 46 from a first position 46*a* to a second position 46*b*, a time range of the time axis 10 changes and thus the time range represented by the first indicator 40*d* changes.

Figure 13E:
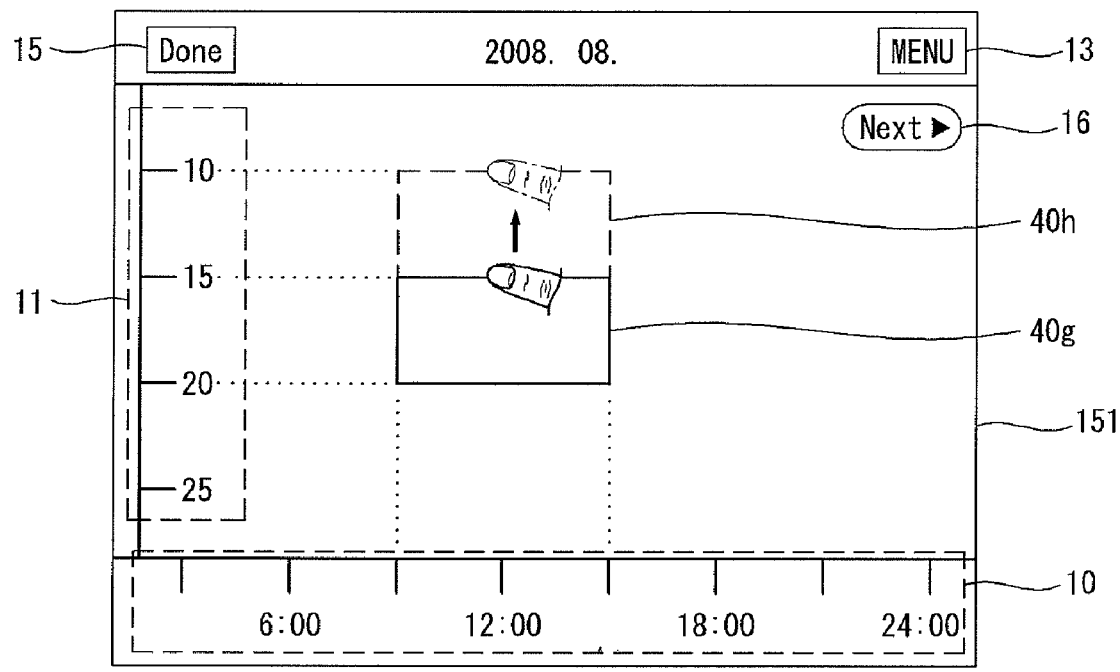

FIG. 13E is a diagram illustrating an example in which a date axis 11 is comprised in addition to the time axis 10 on the scheduler screen.

The controller 180 controls to simultaneously display the time axis 10 and the date axis 11 on the scheduler screen and controls the first indicator to display a predetermined date range and time range.

Referring to FIG. 13E, the controller 180 controls to display the first indicator 40*g* having a date range 'from Aug. 15 to Aug. 20, 2008' and a time range 'from 9 AM to 3 PM' on the scheduler screen. The user can adjust a date range and a time range by dragging after touching a border of upper side/lower side/left side/right side of the first indicator 40*g*. In FIG. 13E, as the user touches and drags an upper border of the first indicator 40*g*, an example of adjusting the first indicator 40*h* to have a date range 'from Aug. 10 to Aug. 20, 2008' is illustrated.

Figure 14A:
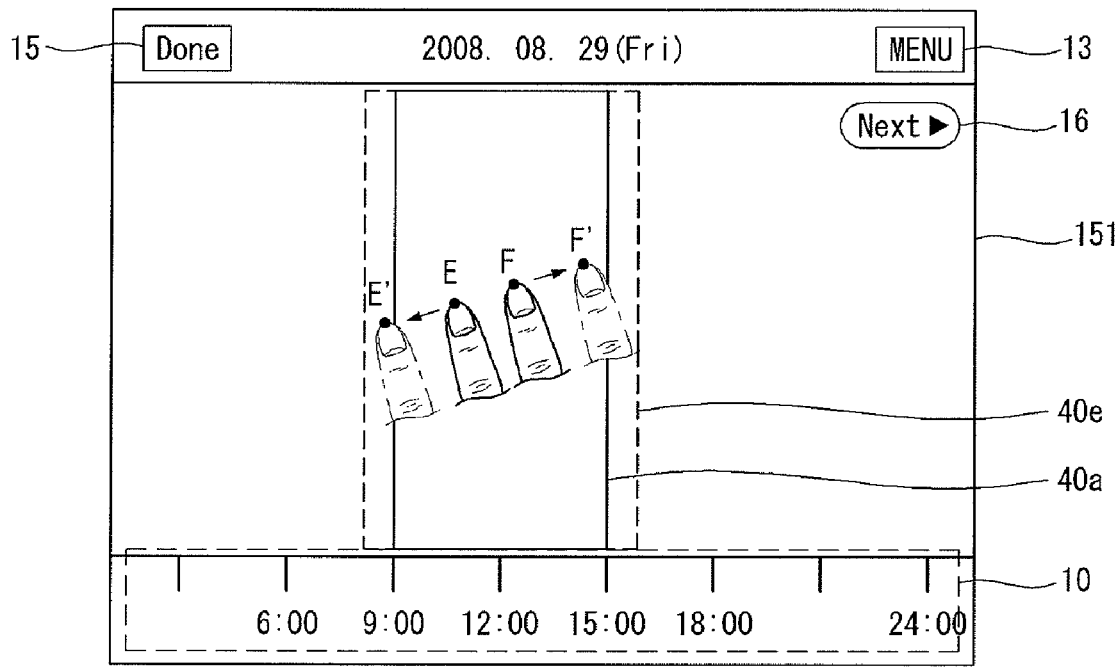

FIG. 14A illustrates an example in which a time range represented by the first indicator changes by the multi-touch.

If the user simultaneously touches two points E and F and drags to other two points E' and F' with two fingers, a time range represented by the first indicator 40*e* changes.

Figure 14B:
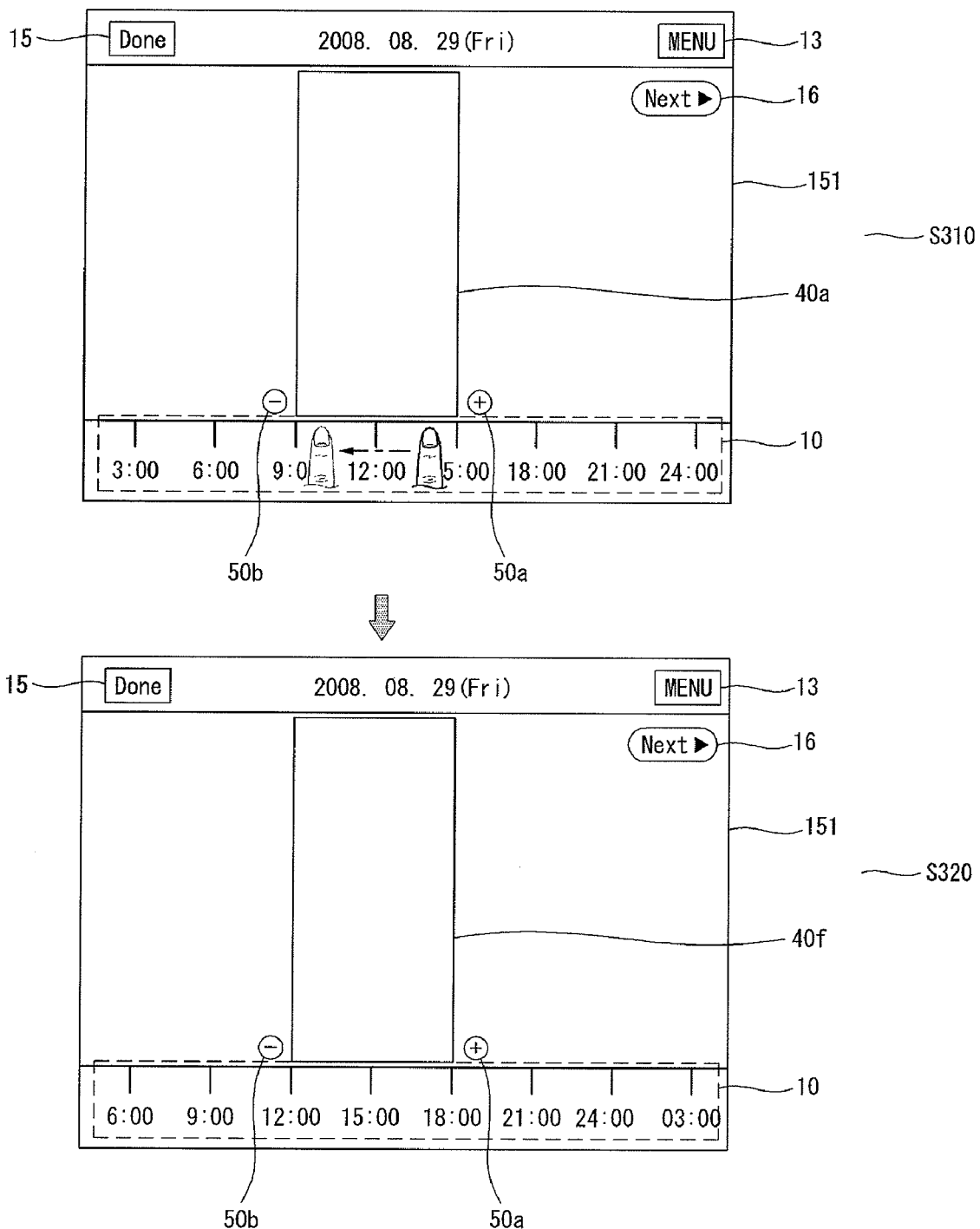

FIG. 14B illustrates an example in which a time range represented by the first indicator changes as the user manufactures the time axis 10 in a state where a position of the first indicator is fixed.

For example, as the user touches and drags an area in which the time axis 10 is displayed, in a state where a position of the first indicator is fixed, the time axis 10 is scrolled. Accordingly, a time range of the first indicator changes. For example, referring to FIG. 14B, when the user touches and drags an area in which the time axis 10 is displayed by a predetermined distance in a left direction (S310), the time axis 10 is scrolled and thus a time range 40*f* of the first indicator changes (S320).

FIGS. 15A to 15D illustrate various methods of setting or changing a date of a schedule item.

Figure 15A:
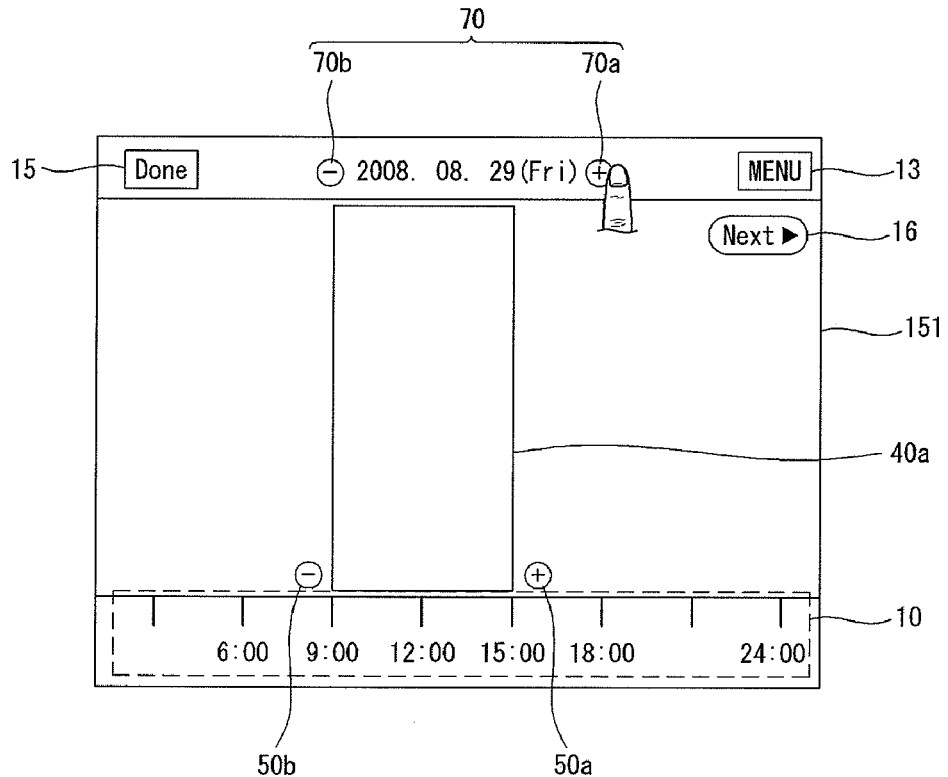
FIGS. 15A to 15D are diagrams illustrating examples of a scheduler screen for changing a date with various methods.
Figure 15B:
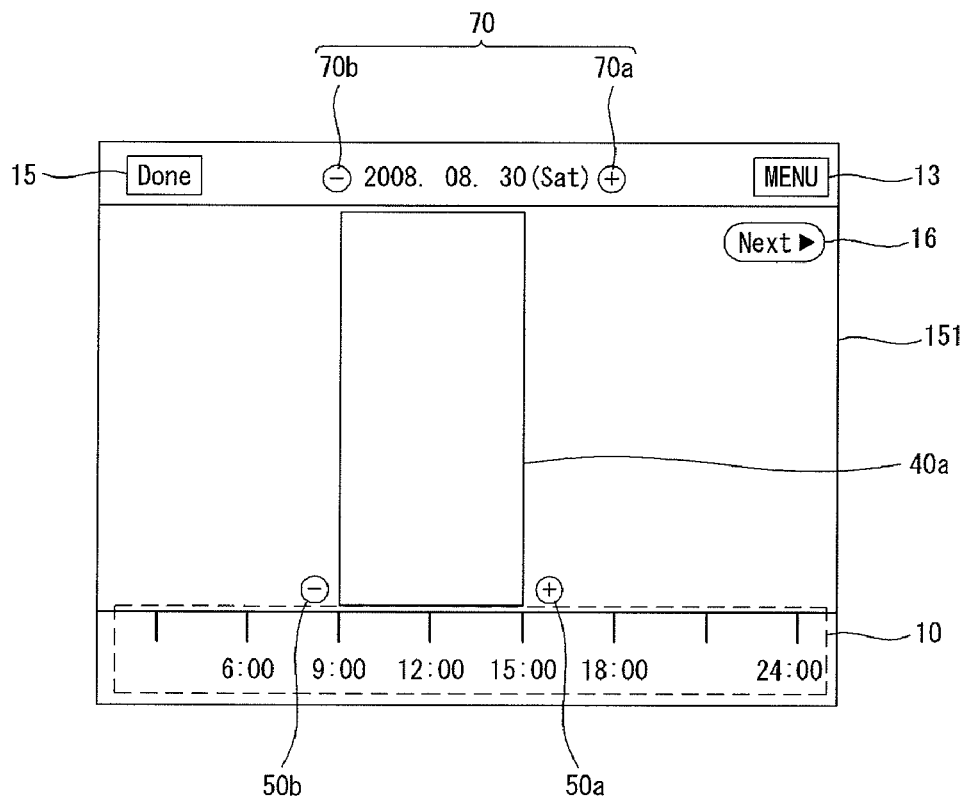

For example, referring to FIGS. 15A and 15B, the user can change a date by manipulating a date change icon 70 adjacent to a date display area. As shown in FIG. 15A, when the user touches a first date change icon 70*a*, a date is changed to a next day, as shown in FIG. 15B. When the user touches a second date change icon 70*b*, a date is changed to a previous day.

Figure 15C:
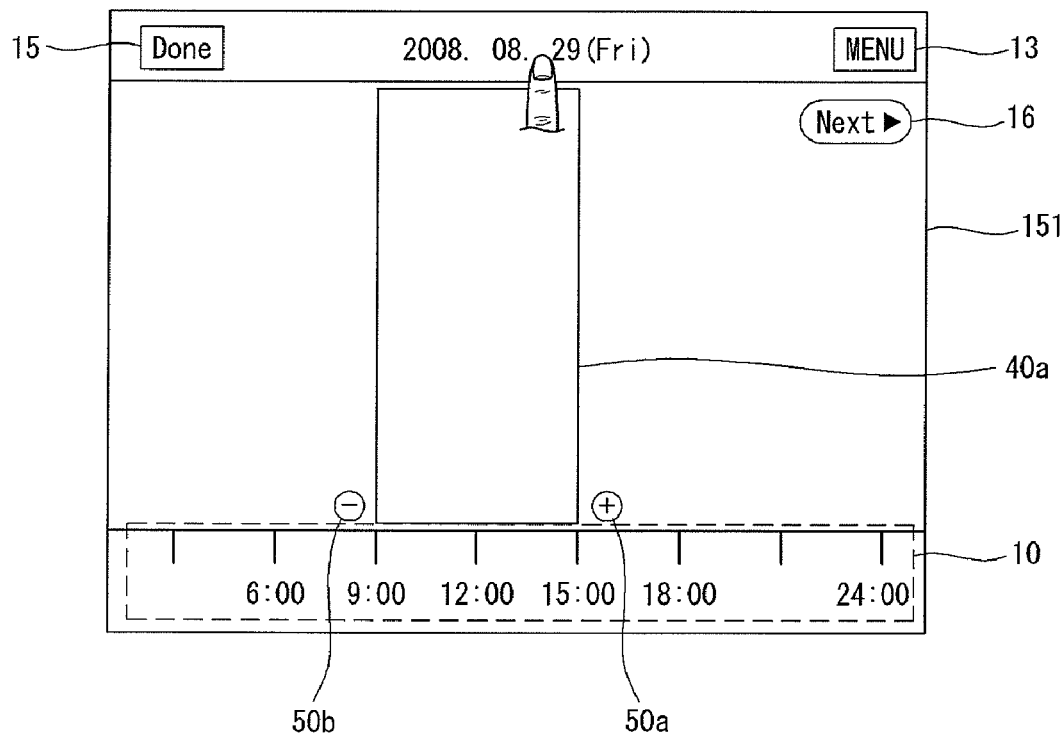
Figure 15D:
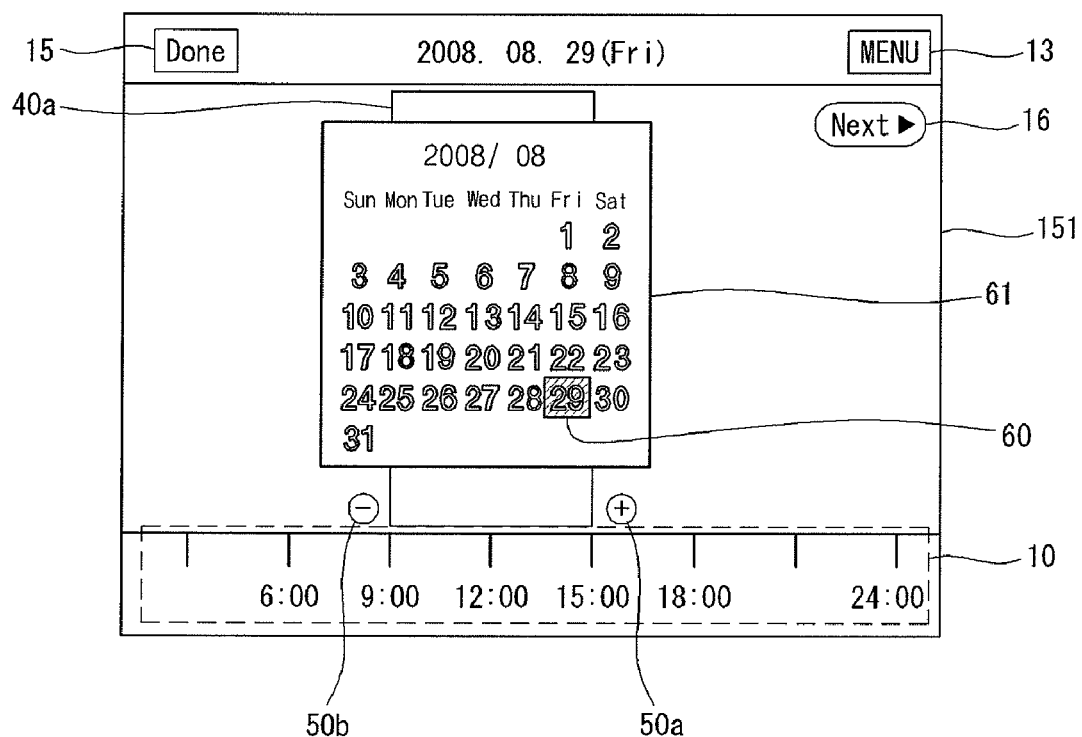

Further, for example, referring to FIGS. 15C and 15D, the user can change a date by touching a date display area. As shown in FIG. 15C, when the user touches a date display area, a popup window 61 comprising a calendar is displayed, as shown in FIG. 15D. The user can change a date of a schedule item by selecting a specific date of a calendar comprised in the popup window 61.

<Conversion of Scheduler Screen According to Position Movement (Rotation)>

Figure 16:
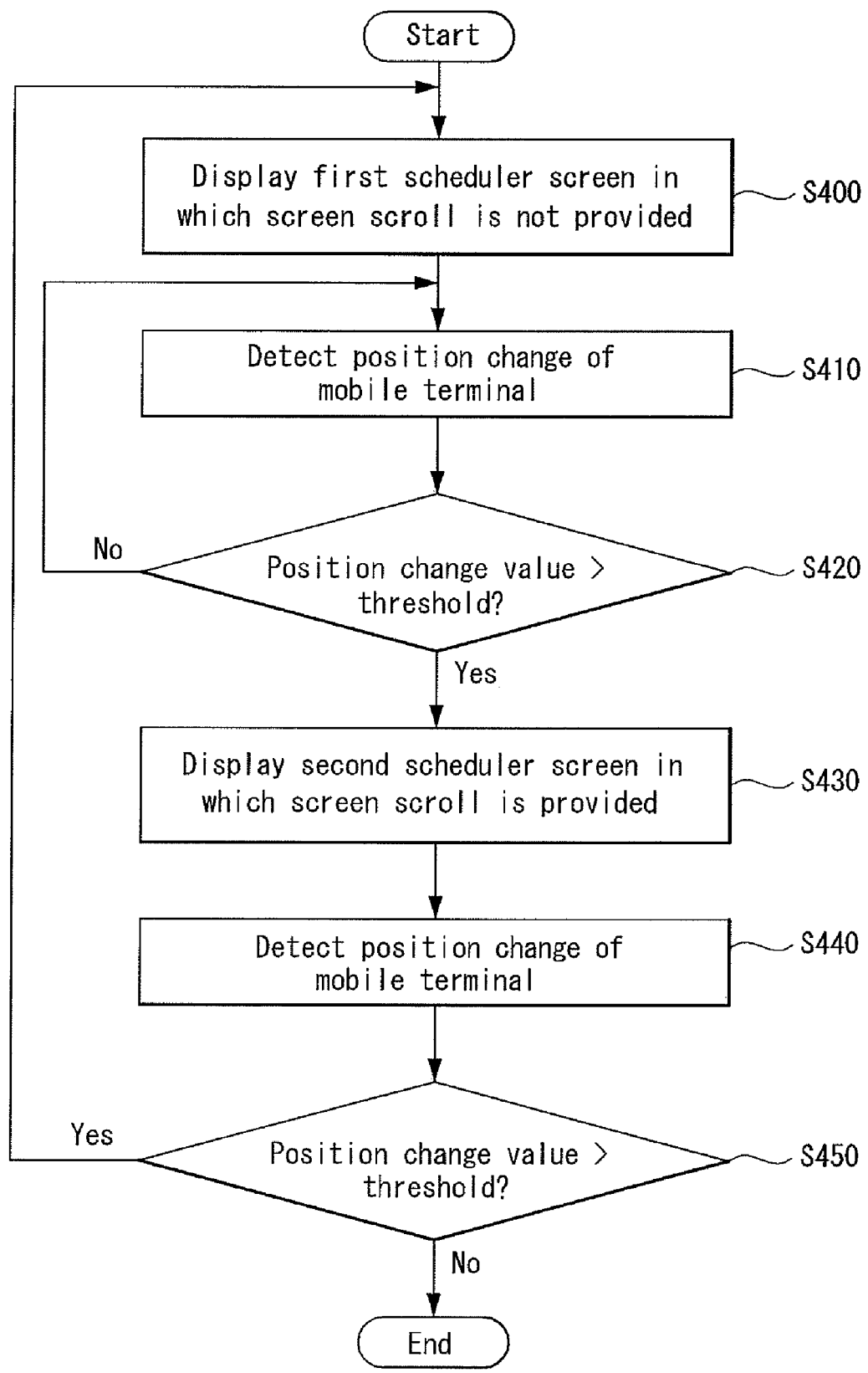
FIG. 16 is a flowchart illustrating a method of providing a scheduler in a mobile terminal according to a fourth implementation of this document.
Figure 17A:
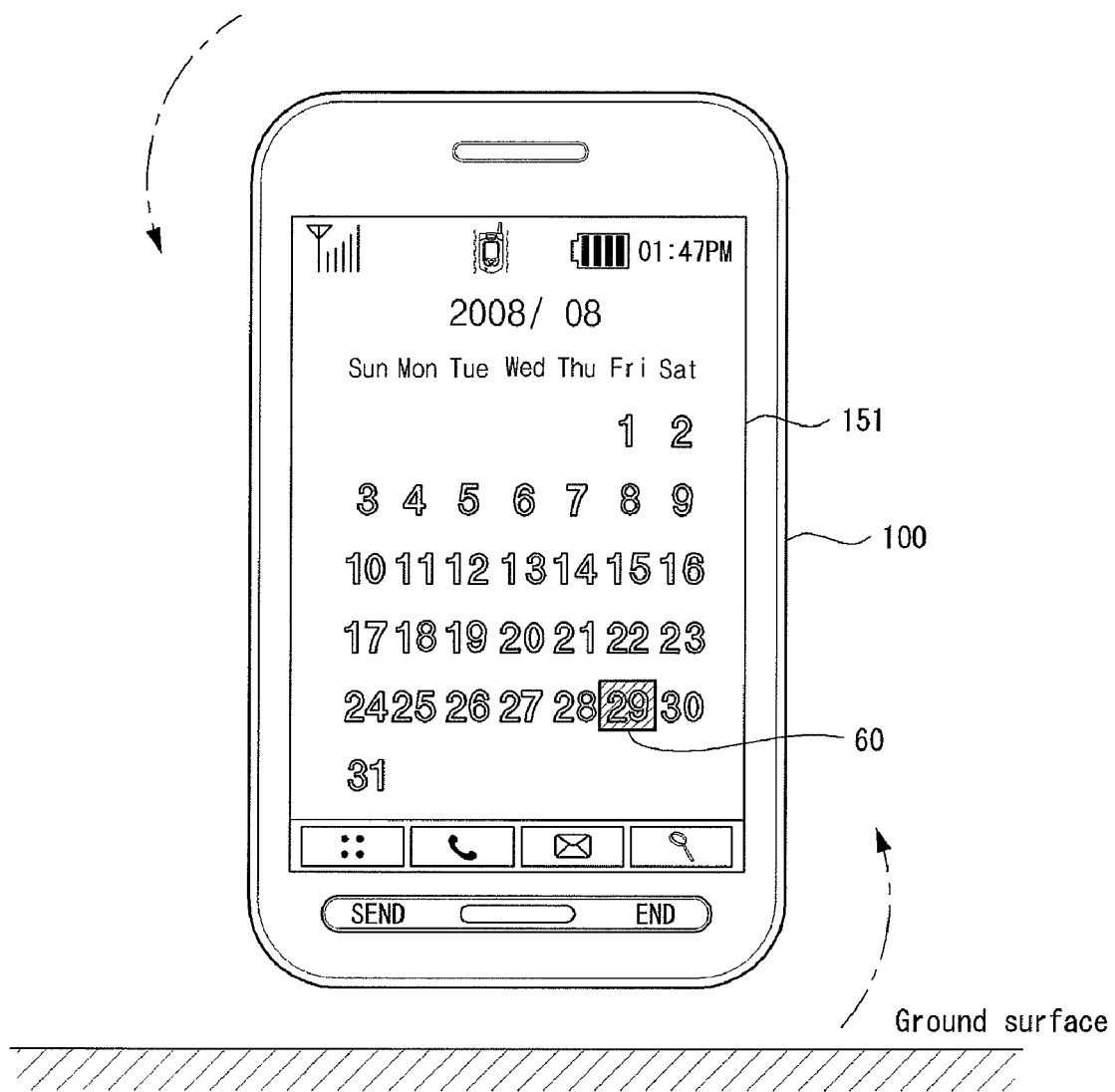
FIGS. 17A and 17B illustrate examples of screens for explaining a method of providing a scheduler in a mobile terminal according to a fourth implementation of this document.
Figure 17B:
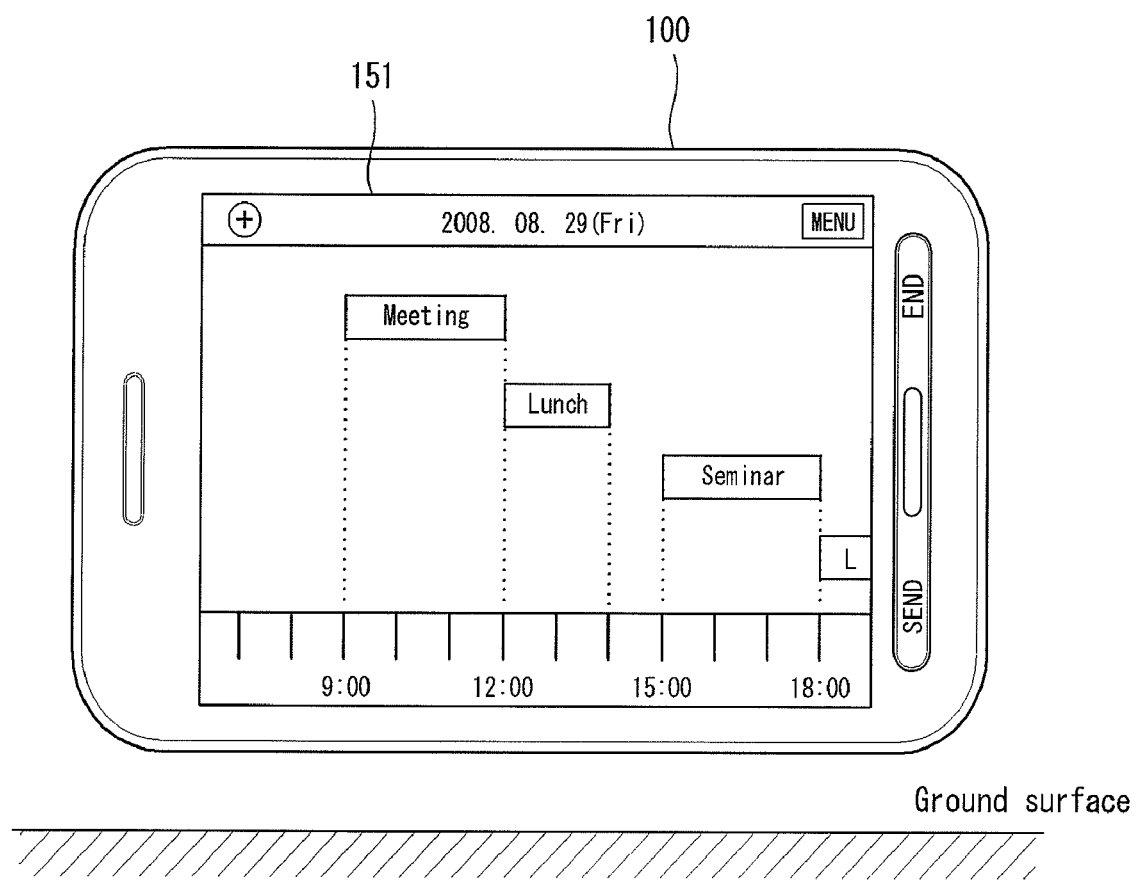

FIG. 16 is a flowchart illustrating a method of providing a scheduler in a mobile terminal according to a fourth implementation of this document. FIGS. 17A and 17B illustrate an example of a scheduler screen in which a screen scroll is not provided and an example of a scheduler screen in which a screen scroll is provided.

A method of providing a scheduler in a mobile terminal according to the fourth implementation of this document can be performed in a mobile terminal 100 described with reference to FIGS. 1 to 4. Hereinafter, the method of providing a scheduler in the mobile terminal according to a fourth implementation of this document and operations of the mobile terminal 100 for performing the method will be described in detail with reference to FIG. 16 and other necessary drawings.

The controller 180 controls to display a first scheduler screen in which a screen scroll is not provided on the touch screen 151 (S400). The first scheduler screen may have very various forms. FIG. 17A illustrates an example of the first scheduler screen.

The controller 180 detects a position change of the mobile terminal 100 (S410). The controller 180 detects the position change using the sensing unit 140. The sensing unit 140 detects a position change of the mobile terminal 100 using at least one of a gyro sensor, an acceleration sensor and a terrestrial magnetism sensor. The position change is a posture change of the mobile terminal 100. The posture change may be linear movement, rotation, etc. For example, referring to FIGS. 17A and 17B, a position of the mobile terminal 100 can be changed from a vertical state (FIG. 17A) to a horizontal state (FIG. 17B) relative to a ground surface.

The controller 180 determines whether a detected position change value is greater than a threshold value (S420).

If a detected position change value is greater than a threshold value, the controller 180 controls to display a second scheduler screen in which a screen scroll is provided on the touch screen 151 (S430).

FIG. 17B illustrates an example of displaying the scheduler screen provided by the screen scroll described in the first implementation of this document on the touch screen 151.

The controller 180 continues to detect a position change of the mobile terminal 100 even after performing step S430 (S440).

The controller 180 determines whether the position change value is greater than a threshold value (S450).

If the position change value is greater than a threshold value, the process returns to step S400. If the position change value is not greater than a threshold value, the process terminates.

A conversion of the scheduler screen according to position movement such as a rotation of the mobile terminal 100 is described, however the conversion of the scheduler screen is not limited thereto.

Figure 18A:
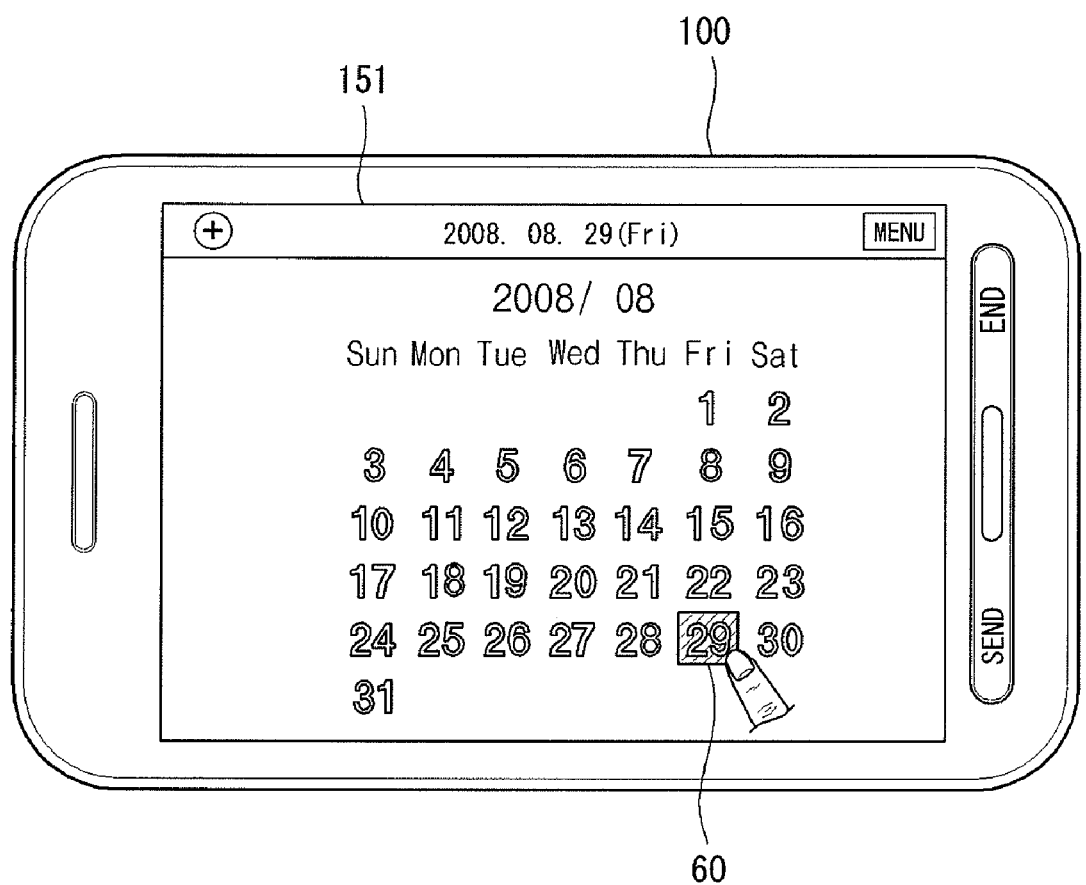
FIGS. 18A and 18B are diagrams illustrating another example in which a scheduler screen is converted.
Figure 18B:
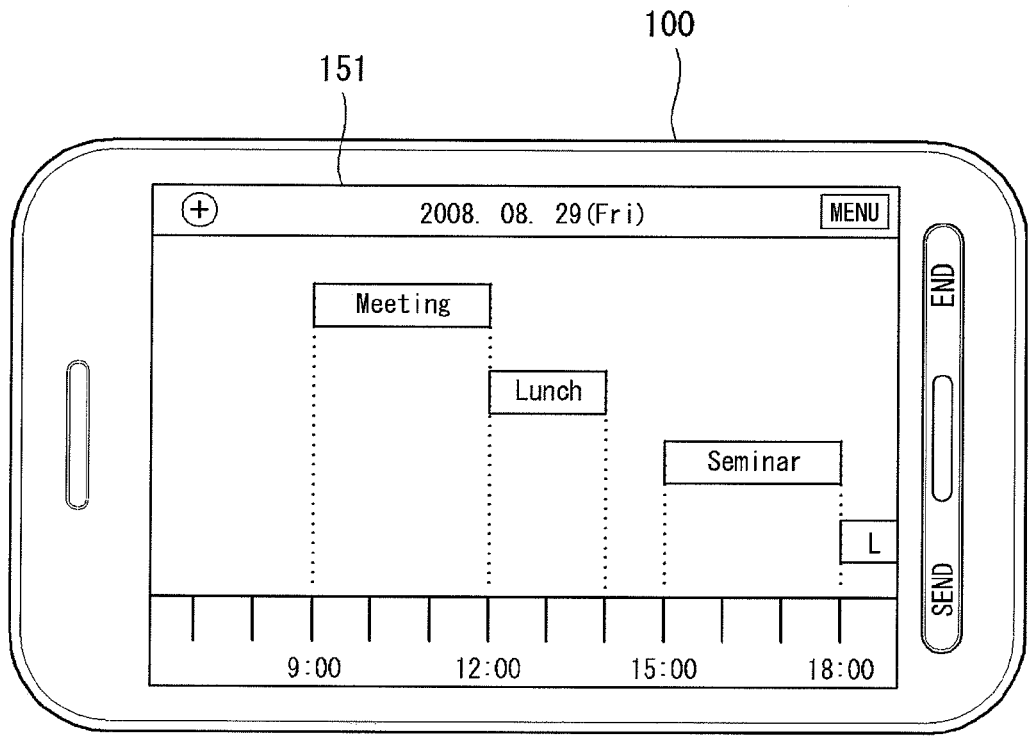

FIGS. 18A and 18B are diagrams illustrating another conversion example of a scheduler screen.

For example, FIG. 18A illustrates a scheduler screen for representing a general calendar. As shown in FIG. 18A, when the user touches a specific date of the calendar, the scheduler screen is converted to the scheduler screen shown in FIG. 6A, as shown in FIG. 18B.

The mobile terminal 100 shown in FIG. 1 is operated in a communication system, for transmitting data through frames or packets, comprising wired/wireless transmission systems and satellite-based communication systems. The communication systems may use different air interfaces and/or physical layers.

Figure 19:
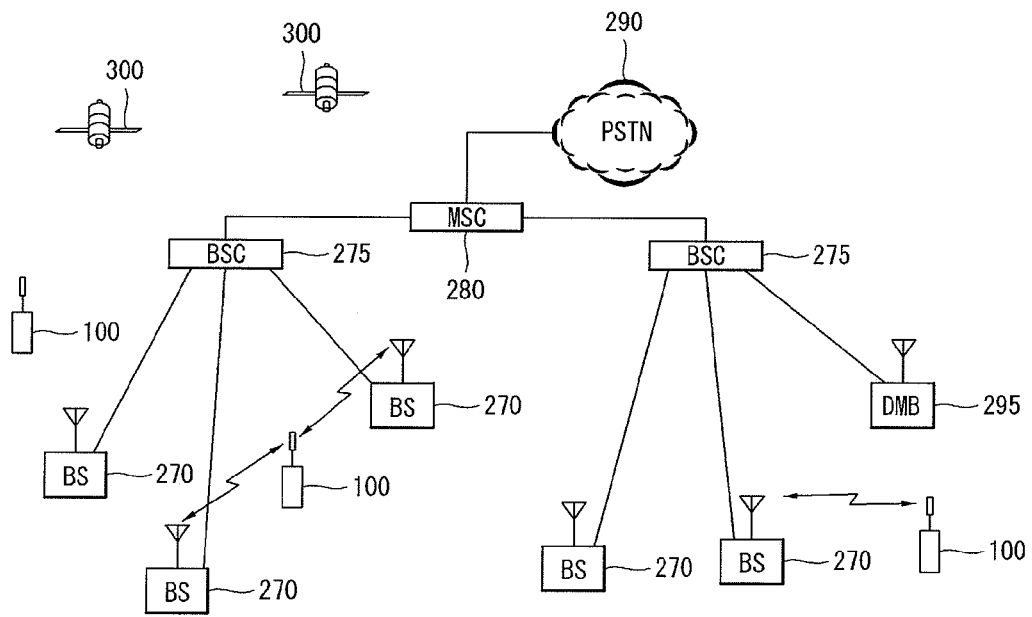
FIG. 19 is a block diagram of a CDMA wireless communication system for communicating with a mobile terminal according to an implementation of this document.

FIG. 19 is a block diagram illustrating a configuration of a CDMA wireless communication system for communicating with the mobile terminal 100 shown in FIG. 1.

The air interfaces used by the communication systems may comprise, for example, frequency division multiple access (FDMA), time division multiple access (TDMA), code division multiple access (CDMA), universal mobile telecommunication system (UMTS), long term evolution (LTE) of the UMTS, and global system for mobile communication (GSM). Hereinafter, only the CDMA communication system is described, however this document is not limited thereto and can be applied to other systems.

Referring to FIG. 19, the CDMA wireless communication system comprises a plurality of mobile terminals 100, a plurality of base stations 200, base station controllers (BSCs) 210, and mobile switching centers (MSCs) 220. The MSCs 220 are connected to a public switch telephone network (PSTN) 230. The MSCs 220 are also connected to the base station controllers 210. The BSCs 210 are connected to the base stations 200 through backhaul lines. The backhaul lines are formed according to E1/T1, ATM, IP, PPP, frame relay, HDSL, ADSL, or xDSL that are known to a person of ordinary skill in the art. It becomes apparent to a person of ordinary skill in the art that the system may comprise two or more BSCs 210.

Each of the base stations 200 comprises one or more sectors, and each sector comprises an omnidirectional antenna or an antenna controlled in a specific radiation direction from the base station 200. Alternatively, each sector may comprise two antennas for diversity reception. Each base station 200 houses a plurality of frequency assignments, and the frequency assignments may have specific spectrum (for example, 1.25 MHz and 5 MHz).

Intersection of sector and frequency assignments is called a CDMA channel. The base stations 200 may be also called base station transceiver subsystems (BTSs). In several examples, a term "base station" may be used as a term for collectively representing the BSCs 210 and one or more base stations 200. The base stations 200 may be also called a "cell site". Alternatively, an individual sector of the given base station 200 may be called a 'cell site'.

A terrestrial DMB transmitter 240 can transmit broadcasting signals to the mobile terminals 100 operating in the system. The broadcasting reception module 111 of the mobile terminal 100 generally receives broadcasting signals transmitted by the DMB transmitter 240. This can be applied similarly to other types of broadcast and multicast signaling described above.

FIG. 19 illustrates several global positioning system (GPS) satellites 250.

The satellites 250 can track a position of some or all mobile terminals 100. In the present implementation, two satellites are illustrated, however it becomes apparent to a person of ordinary skill in the art that position information can be obtained from satellites more than or fewer than two satellites. Other types of position tracking technology (for example, a position tracking technology that can replace a GPS technology, or can be added thereto) can be used. Some or all GPS satellites 250 can separately or additionally supports satellite DMB transmission, as needed.

While operating a wireless communication system, the base stations 200 receive reverse-link signals from several mobile terminals 100. The mobile terminals 100 may perform a communication, send a message, or perform a different communication. Each reverse-link signal received by the base station 200 is processed in the base station 200. The processed data are transmitted to the connected BSCs 210. The BSCs 210 provide call resource allocation and provide mobility management functionality comprising orchestration of soft handoffs between the base stations 200. The BSCs 210 also transmit the received data to the MSCs 220. The MSCs 220 provide additional routing services for interfacing with the PSTN 230. Similarly, the PSTN 230 interfaces with the MSCs 220, and the MSCs 220 interface with the BSCs 210. The BSCs 210 sequentially control the base stations 200 to transmit forward-link signals to the mobile terminals 100.

The above-described method of providing a scheduler in a mobile terminal of this document can be recorded and provided in a computer readable recording medium with a computer executable program.

The method of providing a scheduler in a mobile terminal of this document can be executed through software. When the method is executed with software, constituent means of this document are code segments for executing a necessary operation. The program or the code segments may be stored in a processor readable medium, or be transmitted by a computer data signal coupled to a carrier wave in a transmission medium or a communication network.

The computer readable recording medium comprises all kinds of recording devices in which data that can be read by a computing system are stored. The computer readable recording medium comprises, for example, a ROM, a RAM, a CD-ROM, a DVD-ROM, a DVD-RAM, a magnetic tape, a floppy disk, a hard disk, and an optical data storage device. Further, the computer readable recording medium is distributed to a computer system connected to a network, and a computer readable code is stored and executed in a distribution manner.

According to a mobile terminal and a method of providing a scheduler therein of this document, a user can more simply and conveniently input/inquire/manage a schedule. Further, the user can easily access to previously input schedule items without a complicated menu search or a search process.

It will be apparent to those skilled in the art that various modifications and variations can be made in this document without departing from the spirit or scope of the inventions. Thus, it is intended that this document covers the modifications and variations of this invention provided they come within the scope of the appended claims and their equivalents.

What is claimed is:

1. A mobile terminal comprising:
   a touch screen;
   a memory unit for storing a scheduler for providing a plurality of scheduler screens comprising a first scheduler screen including a first scheduler region in a vertical state and a second scheduler screen including a second scheduler region in a horizontal state;
   a position detection unit for detecting a rotation of the mobile terminal; and
   a controller for converting, when displaying the first scheduler screen on the touch screen, if a rotation degree of the mobile terminal detected by the position detection unit is greater than a threshold value, the first scheduler screen to the second scheduler screen,
   wherein the first scheduler region is not scrolled based on a flicking signal generated based on a flicking gesture on the first scheduler region by a user, wherein the second scheduler region is scrolled based on a flicking signal generated based on a flicking gesture on the second scheduler region by the user, and wherein each flicking signal is generated by a left to right flicking gesture or a right to left flicking gesture on a corresponding scheduler region.

2. The mobile terminal of claim 1, wherein a screen for the first scheduler screen and the second scheduler screen can be zoomed-in or zoomed-out according to a predetermined input signal and changes a time range thereof according to the zoom-in or zoom-out.

3. The mobile terminal of claim 1, wherein the first scheduler region includes a region in which a calendar is displayed and the second scheduler region includes a region in which schedule items corresponding to at least one date included in the calendar can be displayed.

4. A method of providing a scheduler in a mobile terminal having a touch screen, comprising:
   displaying a first scheduler screen provided by the scheduler on the touch screen in a vertical state, wherein the first scheduler screen includes a first scheduler region;
   detecting a rotation of the mobile terminal; and
   converting, if a rotation degree of the mobile terminal is greater than a threshold value, the first scheduler screen to a second scheduler screen provided by the scheduler,
   wherein the first scheduler region is not scrolled based on a flicking signal generated based on a flicking gesture on the first scheduler region by a user, wherein the second scheduler region is scrolled based on a flicking signal generated based on a flicking gesture on the second scheduler region by the user, and wherein each flicking signal is generated by left to right flicking gesture or right to left gesture on a corresponding scheduler region.

5. The method of claim 4, wherein a screen for the first scheduler screen and the second scheduler screen can be zoomed-in or zoomed-out according to a predetermined input signal and changes a time range thereof according to the zoom-in or zoom-out.

6. The method of claim 4, wherein the first scheduler region includes a region in which a calendar is displayed and the second scheduler region includes a region in which schedule items corresponding to at least one of date included the calendar can be displayed.

* * * * *